United States Patent
Furomoto et al.

(10) Patent No.: US 8,075,972 B2
(45) Date of Patent: Dec. 13, 2011

(54) OPTICAL RECORDING MEDIUM

(75) Inventors: Shigeyuki Furomoto, Minato-ku (JP); Masaaki Mizuno, Minato-ku (JP); Naoyuki Uchida, Minato-ku (JP)

(73) Assignee: Mitsubishi Kagaku Media Co., Ltd., Tokyo (JP)

( * ) Notice: Subject to any disclaimer, the term of this patent is extended or adjusted under 35 U.S.C. 154(b) by 921 days.

(21) Appl. No.: 11/910,980

(22) PCT Filed: Apr. 7, 2006

(86) PCT No.: PCT/JP2006/307448
§ 371 (c)(1), (2), (4) Date: Apr. 1, 2008

(87) PCT Pub. No.: WO2006/109722
PCT Pub. Date: Oct. 19, 2006

(65) Prior Publication Data
US 2009/0022933 A1    Jan. 22, 2009

(30) Foreign Application Priority Data
Apr. 7, 2005    (JP) .................. 2005-111244

(51) Int. Cl.
B32B 3/02    (2006.01)

(52) U.S. Cl. .............. 428/64.1; 428/64.4; 428/64.8
(58) Field of Classification Search .............. 428/64.8; 430/270.14
See application file for complete search history.

(56) References Cited

U.S. PATENT DOCUMENTS

| | | |
|---|---|---|
| 2003/0137921 A1 | 7/2003 | Higuchi |
| 2005/0221050 A1* | 10/2005 | Shinotsuka et al. ......... 428/64.4 |
| 2005/0223402 A1 | 10/2005 | Van Den Oetelaar et al. |
| 2005/0243699 A1 | 11/2005 | Noda et al. |
| 2007/0154675 A1* | 7/2007 | Yang et al. .................. 428/64.4 |
| 2007/0283377 A1 | 12/2007 | Nakamura et al. |
| 2008/0090174 A1 | 4/2008 | Mikoshiba et al. |

FOREIGN PATENT DOCUMENTS

| | | |
|---|---|---|
| DE | 41 15 321 A1 | 11/1991 |
| JP | 2000-207772 | 7/2000 |
| JP | 2000-311384 | 11/2000 |
| JP | 2002-373451 | 12/2002 |
| JP | 2003-36562 | 2/2003 |
| JP | 2003-308633 | 10/2003 |
| JP | 2004-335076 | 11/2004 |

(Continued)

OTHER PUBLICATIONS

Extended European Search Report issued on Sep. 29, 2010, in European Patent Application No. 06731395.7.

*Primary Examiner* — Elizabeth Mulvaney
(74) *Attorney, Agent, or Firm* — Oblon, Spivak, McClelland, Maier & Neustadt, L.L.P.

(57) ABSTRACT

To provide an optical recording medium exhibiting favorable write/read characteristics in high-speed recording. In an optical recording medium including a reflective layer, a dye-containing recording layer, and a transparent resin layer on a substrate in this order, a barrier layer is disposed between the recording layer and the resin layer, where the barrier layer comprises a material having a bulk thermal conductivity M of 70 W/m·K or more at 300 K and has a thickness t less than 5 nm.

10 Claims, 6 Drawing Sheets

FOREIGN PATENT DOCUMENTS

| | | |
|---|---|---|
| JP | 2005-50497 | 2/2005 |
| JP | 2005-71492 | 3/2005 |
| JP | 2005-78655 | 3/2005 |
| JP | 2005-85350 | 3/2005 |
| JP | 2005-88210 | 4/2005 |
| JP | 2005-88293 | 4/2005 |
| JP | 2005-100493 | 4/2005 |
| JP | 2005-267670 | 9/2005 |
| JP | 2005-267671 | 9/2005 |
| JP | 2005-537603 | 12/2005 |
| WO | WO 2005/101394 A1 | 10/2005 |
| WO | WO 2006/001460 A1 | 1/2006 |

* cited by examiner

OPTICAL RECORDING MEDIUM

TECHNICAL FIELD

The present invention relates to an optical recording medium, more specifically, relates to an optical recording medium which can achieve satisfactory write/read characteristics in high-speed recording.

BACKGROUND ART

Various optical recording media such as DVD-RW and DVD-R can record a large volume of information and can easily retrieve data in a random access mode, and thereby have been widely used, recently, as external recording devices for information processors such as computers. For example, a typical DVD-R having an organic dye-containing recording layer has a laminated structure in which a dye recording layer and a reflective layer are disposed on a transparent substrate in this order and a protective layer covers these recording and reflective layers. Recording and reading are performed by laser light passing through the substrate. In addition, in order to increase the storage capacity of these optical recording media, multilayer optical recording media, each having a plurality of recording layers, have been developed. For example, a dual-layer optical recording medium including two dye-recording layers and an intermediate layer on a first disk transparent substrate has been reported. The intermediate layer is composed of an ultraviolet-curable resin and is disposed between the dye-recording layers.

Such a dual-layer optical recording medium can be prepared by a 2P (photo polymerization) process using a transparent stamper and by a process comprising forming two disk substrates each having a recording layer and a reflective layer stacked thereon and bonding the two disk substrates with a photo curable resign layer interposed between them.

In the both processes, the reflective layer and the dye-containing recording layer (hereinafter, referred to as a recording layer (1) or a second-layer recording layer) are stacked in this order on a substrate, which is most far from the incident face of laser light.

In the process bonding the two disk substrates each having a recording layer and a reflective layer stacked thereon, a dual-layer optical recording medium is produced by preparing a first disk substrate by stacking a recording layer and a reflective layer in this order on a substrate having guide grooves serving as recording tracks (hereinafter sometimes referred to as "conventional stack" or "conventional stack structure" by likening the transparent resin layer provided with grooves to a substrate) and a second disk substrate by laminating a reflective layer and a recording layer in this order on the other substrate (hereinafter sometimes referred to as "inverted stack" or "inverted stack structure"); applying a photo-curable resin on these disk substrates; and then attaching the resin-coated faces and curing the photo-curable resin. Optical information is written on and read from the two recording layers using a write/read light incident on the first disk substrate. This process stacking the two disk substrates does not require the transfer of an asperity pattern on a transparent stamper, unlike the 2P process, resulting in high productivity and low cost.

In the inverted stack structure, it is known that a so-called "barrier layer" is disposed between the recording layer and the photo-curable resin (see Patent Documents 1 and 2).

[Patent Document 1] Japanese Patent Application Laid-Open No. 2000-311384 (paragraphs [0052] and [0053], and Example 2)

[Patent Document 2] Japanese Patent Application Laid-Open No. 2002-373451 (paragraphs [0034] and [0035], and Example)

DISCLOSURE OF INVENTION

Problems to Be Solved by the Invention

A prerequisite for an optical recording medium having an organic dye-containing recording layer is to prevent the occurrence of crosstalk in high-speed recording more effectively. The present inventors have revealed through investigation that the crosstalk is mainly caused by the thermal conductivity of an organic dye that is significantly lower than those of recording layers of other known inorganic recording media (for example, DVD-RWs).

More specifically, in general, in the recording layer containing an organic dye, the organic dye is decomposed by absorbing converged recording laser light to change the optical constant and to be decreased in the thickness where the dye is decomposed, therefore the pressure is increased, and the periphery of the recording layer exposed to high temperature is changed to a recorded portion. In this case, the thermal diffusion, in particular, heat dissipation along the recording layer plane, hardly occurs. Therefore, the recorded portion tends to expand toward the adjacent track areas. Furthermore, if the recording is made in a plurality of tracks, crosstalk tends to increase. Due to these tendencies, good jitter cannot be readily obtained.

Furthermore, in case of the high-speed recording, since the recording pulse is shortened, the dye can be decomposed with recording laser light power higher than that in low-speed recording. As a result, the recording layer is exposed to a higher temperature than that in low-speed recording, and thereby crosstalk tends to be significantly increased.

The generation of crosstalk may be observed in a dual-layer optical recording medium produced by the 2P process, but is significantly observed in a dual-layer optical recording medium produced by bonding two disk substrates, in particular, in the recording layer (hereinafter referred to as "a second-layer recording layer") placed remote from the incident face of write/read light. As described above, the second-layer recording layer of the dual-layer optical recording medium produced by the bonding these two disk substrates is provided in an inverted stack composed of a reflective layer and a recording layer laminated on a substrate. When optical information is recorded on land region of the substrate in such an inverted stack, the thickness of the recording layer on the land region must be increased in order to secure the—recording modulation. In such a case, tracks adjacent to the recoding regions correspond to grooves of the substrate, and thereby the thickness of the recording layer is likely to be larger than that of the land regions. Therefore, the thickness of the recording layer at the grooves is increased, and thereby recording marks laterally expand and crosstalk tends to easily increase. This difference in the recording layer thickness between the groove and the land regions readily occurs in a case of applying an organic dye solution.

In the second disk substrate placed remote from the incident face of write/read light in the dual-layer optical recording medium, the depth of guide grooves is shallower than that of conventional guide grooves in order to secure adequate reflectivity of the write/read light. As a result, the physical barrier effect of the guide grooves is impaired, and excessive deformation of the substrate due to, for example, flow deformation of a resin of the substrate readily occurs during recording. Therefore, the crosstalk tends to be increased.

The present invention has been accomplished to solve the aforementioned problems.

That is, an object of the present invention is to provide an optical recording medium containing an inverted stack structure which has satisfactory write/read characteristics in high-speed recording applications.

Another object of the present invention is to provide a dual-layer optical recording medium including a second-layer recording layer which is excellent, in particular, in high-speed recording.

Means for Solving the Problems

The present inventors have conducted intensive studies and have found the fact that the above-described problems can be effectively solved by forming a barrier layer between a recording layer and a transparent resin layer with a material having a high thermal conductivity of a bulk state such that the formed barrier layer has a very small thickness.

Furthermore, the present inventors have found the fact that various requirements for a second-layer recording layer of a dual-layer optical recording medium can be satisfied and sufficient light fastness can be maintained by adding a specific dye which is particularly excellent in high-speed recording to the second-layer recording layer.

A gist (Claim 1) of the present invention is an optical recording medium including a reflective layer, a dye-containing recording layer, and a transparent resin layer on a substrate in this order and further including a barrier layer between the recording layer and the resin layer. The barrier layer comprises a material having a thermal conductivity M of a material's bulk of 70 W/m·K or more at 300 K and has a thickness t less than 5 nm.

Another gist (Claim 8) of the present invention is an optical recording medium including a first reflective layer, a dye-containing first recording layer, a transparent resin layer, a dye-containing second reflective layer, a second recording layer, and a second substrate on a first substrate in this order. The dye contained in the first recording layer (second-layer recording layer) comprises at least a metal-complex azo dye composed of an azo compound represented by the following formula (1) and Zn ions.

[Formula 1]

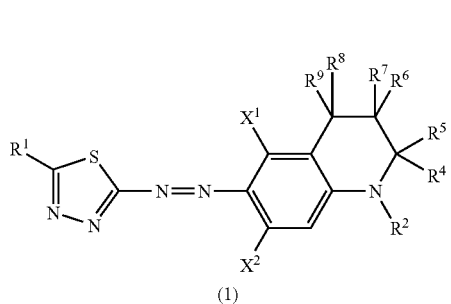

(1)

where
$R^1$ denotes a hydrogen atom or an ester group represented by $CO_2R^3$ (where $R^3$ denotes a linear or branched alkyl group or a cycloalkyl group);

$R^2$ denotes a linear or branched alkyl group; at least one of $X^1$ and $X^2$ denotes an $NHSO_2Y$ group (where Y denotes a linear or branched alkyl group containing at least two substituted fluorine atoms) and $X^1$ or $X^2$ not being the $NHSO_2Y$ group is a hydrogen atom;

$R^4$ and $R^5$ independently denote a hydrogen atom, a linear or branched alkyl group, or a linear or branched alkoxy group; and $R^6$, $R^7$, $R^8$, and $R^9$ independently denote a hydrogen atom or an alkyl group having one or two carbon atoms;

with the proviso that the $NHSO_2Y$ group is modified to an $NSO_2Y^-$ (anionic) group by $H^+$ dissociation and that the azo compound represented by the formula (1) forms a coordinate bond with the metal ions.

In the above-mentioned another gist of the present invention, an intermediate layer having guide grooves formed by the 2P process in a dual-layer optical recording medium (hereinafter referred to as "2P layer") is included in the definition of the transparent resin layer.

EFFECTS OF THE INVENTION

Thus, according to the present invention, an optical recording medium exhibiting satisfactory write/read characteristics in high-density and high-recording application can be obtained.

Figure 1A:
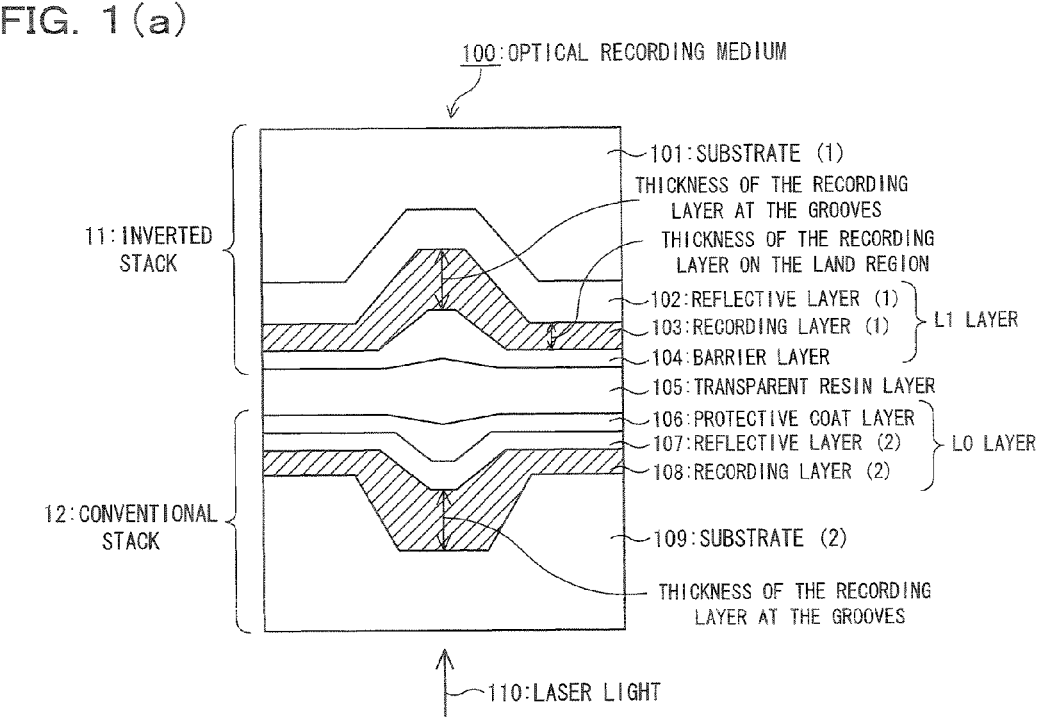
FIG. 1(a) is a schematic cross-sectional view illustrating a structure of an optical recording medium according to a first embodiment of the present invention.

REFERENCE NUMERALS 11 inverted stack
12 conventional stack
100, 200, 300 optical recording medium
101, 308 substrate (1)
102, 306 reflective layer (1)
103, 305 recording layer (1)
104, 204 barrier layer
105, 205 transparent resin layer
304 transparent resin layer (2P layer)
106 protective coat layer 107, 303 reflective layer (2)
108, 302 recording layer (2)
109, 301 substrate (2)
110, 210, 310 laser light
201 substrate
202 reflective layer
203 recording layer
307 adhesion layer

BEST MODE FOR CARRYING OUT THE INVENTION

The best mode for carrying out the invention (referred to as "embodiment of the present invention") will now be described, however the present invention is not limited to the following embodiments and can be variously modified within the scope of the invention
[Fundamental Concept 1 of the Invention]

A first optical recording medium according to the present invention includes a reflective layer, a dye-containing recording layer, and a transparent resin layer on a substrate in this order, as fundamental elements. In addition, the first optical recording medium may include a barrier layer between the recording layer and the resin layer, according to need.

The present invention is characterized in that the barrier layer is composed of a material with a high thermal conductivity. This can effectively dissipate the heat generated in the recording layer of an inverted stack during recording, preventing excessive deformation during recording and suppressing crosstalk.

Another characteristic of the present invention is that the barrier layer has a thickness less than 5 nm. With such a thin barrier layer, recording light is not attenuated and thereby satisfactory recording characteristics can be obtained without reducing the recording sensitivity of the inverted stack structure, even if the barrier layer is composed of a metal or an alloy having a high extinction coefficient. Furthermore, a favorable recording edge can be formed.

The reduction in crosstalk according to the present invention is noticeable when the grooves of the substrate used in the reverse laminate have a certain shape, in particular, when the depth of grooves is less than about one-fifth that of grooves of a usual conventional stack or a second disk substrate. That is, the advantage of the present invention is noticeable when the grooves of the inverted stack substrate are shallow for ensuring a certain disk reflectivity and maintaining high recording sensitivity When the groove depth is shallow, physical barrier effects caused by the groove wall of the substrate, i.e., barrier effects of blocking the transfer of the dye or the liquid resin of the substrate during recording, cannot be readily achieved. Therefore, for example, the recorded portion is excessively deformed during recording, resulting in significant crosstalk. Therefore, it is preferred that the present invention be applied to an inverted stack including a substrate having grooves shallower than conventional grooves.

Such a relationship between the thermal conductivity of the barrier layer and the recording characteristics is also supported by the results shown in FIG. 2 of [Experimental Example 1] described below. Here, jitter obtained when signals are written on a plurality of tracks and when signals written on two adjacent tracks are read is represented by MT (%). Jitter obtained when signals written on one track between two adjacent unrecorded tracks are read is represented by ST (%). The MT (%) contains the crosstalk component, whereas the ST (%) does not contain the crosstalk component.

A large difference, Δjitter, between the MT (%) and the ST (%) means large crosstalk. Even if the ST (%) is satisfactorily low, for example, 7%, the MT (%) exceeds 9% at a Δjitter value of higher than 2%. Therefore, a Δjitter value of 2% or less is preferred.

Figure 2:
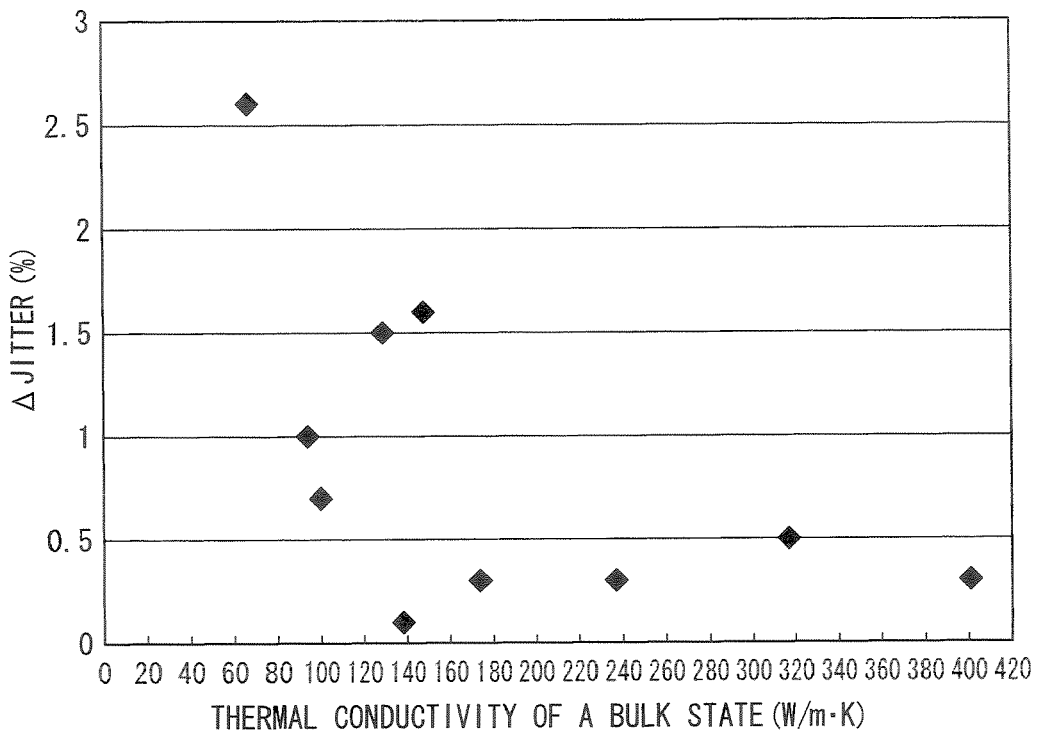
FIG. 2 is a graph showing the relationship between the thermal conductivity of bulk materials for barrier layer materials and Δjitter in the inverted stack of the optical recording medium produced in Experimental Example 1.

With the view of this fact, FIG. 2 shows that the Δjitter value is lower than 2% at a thermal conductivity of 70 W/m·K or more in this example, and satisfactory characteristics are obtained.

On the other hand, the jitter cannot be improved when the thickness of the barrier layer is higher than 5 nm, as supported by the results shown in Table 3 of [Experimental Example 2] described below. A possible reason for this is that a thickened layer attenuates the intensity of recording light to decrease recording sensitivity. In addition, a change in morphology of the film caused by an increased film thickness may adversely affect the jitter. The morphology of the film can be controlled to some extent by adjusting sputtering conditions and the film composition.

The optical recording medium according to the present invention can be used as a multilayer optical recording medium by further providing a second reflective layer, a second recording layer, and a transparent substrate in this order on the transparent resin layer of the above-described fundamental elements at the opposite side of the inverted stack.

First Embodiment

FIG. 1(a) is a schematic cross-sectional view illustrating a structure of an optical recording medium according to a first embodiment of the present invention. FIG. 1(a) shows a dual-layer optical recording medium 100 including a disk substrate composed of a reflective layer and a recording layer stacked on a transparent substrate in this order (inverted stack 11) and a disk substrate composed of a recording layer and a reflective layer on a transparent substrate in this order (forward laminate 12).

As shown in FIG. 1(a), the optical recording medium 100 includes, as the inverted stack 11, a light-transmissive disk substrate (1) 101 provided with grooves and lands or pre-pits, a reflective layer (1) 102 disposed on a laser light 110 incident side of the substrate (1) 101, a dye-containing recording layer (1) 103, and a barrier layer 104. The dual-layer optical recording medium 100 further includes, as the forward laminate 12, a light-transmissive disk substrate (2) 109 provided with grooves and lands or pre-pits, a dye-containing recording layer (2) 108 disposed on the substrate (2) 109, a semi-transparent reflective layer (2) 107 distributing the power of laser light 110 incident on the substrate (2) 109, and a protective coat layer 106 disposed on the reflective layer (2) 107. The reverse laminate 11 and the conventional stack 12 are stacked with a transparent resin layer 105 therebetween such that the barrier layer 104 and the protective coat layer 106 oppose each other. Thus, a dual-layer optical recording medium 100 is fabricated. Optical information is written and read by laser light 110 incident on the substrate (2) 109 of the conventional stack 12 in the recording layer (1) 103 and the recording layer (2) 108.
[Inverted Stack]

Next, each layer of the inverted stack 11 will be described. The inverted stack 11 composed of, as described above, a substrate (1) 101; and a reflective layer (1) 102, a recording layer (1) 103, and a barrier layer 104 which are stacked on the substrate (1) 101 (hereinafter, the reflective layer (1) 102, the recording layer (1) 103, and the barrier layer 104 are collectively referred to as "L1 layer").

<Substrate (1)>

The substrate (1) 101 is desirably made of a material which has light transmissivity and is excellent in optical properties such as a low index of birefringence. In addition, it is desirable that the substrate (1) 101 be made of a material which is excellent in moldability such as read injection moldability and exhibits low moisture absorption. In addition, it is desirable that the substrate (1) 101 has satisfactory shape stability so that the optical recording medium 100 has a certain rigidity. Nonlimiting examples of such materials include acrylic resins, methacrylic resins, polycarbonate resins, polyolefin resins (particularly, amorphous polyolefins), polyester resins, polystyrene resins, epoxy resins, and glass. In addition, the substrate (1) 101 may be composed of a resin layer of a radiation-curable resin such as a photo-curable resin disposed on a glass substrate, for example. Among these examples, a polycarbonate resin substrate is preferred from the viewpoints of satisfactory optical properties, high productivity such as moldability, cost, low moisture absorption, and shape stability. From the viewpoints of satisfactory chemical resistance and low moisture absorption, an amorphous polyolefin substrate is preferred. From the viewpoint of high-speed responsibility, a glass substrate is preferred.

The substrate (1) 101 is not necessarily required to be light transmissive and, therefore, may be provided with a lining of an adequate material for increasing mechanical stability and enhancing rigidity thereof. Examples of the material include Al-alloy substrates such as Al-Mg alloys containing Al as the main components; Mg alloy substrates such as Mg—Zn alloys containing Mg as the main components; and substrates of silicon, titanium, ceramics, or paper or combination of these.

The depth of the guide grooves of the substrate (1) 101 constituting the inverted stack 11 is generally $\lambda/100$ or more, preferably $2\lambda/100$ or more, and more preferably $2.2\lambda/100$ or more, where $\lambda$ is the write/read wavelength. For example, for a wavelength $\lambda$ of the write/read light (write/read wavelength) of 660 nm, the groove depth of the substrate (1) 101 is generally 6.6 nm or more, preferably 13 nm or more, and more preferably 14.5 nm or more.

The upper limit of the groove depth of the substrate (1) 101 of the inverted stack 11 is preferably 110 nm or less. In particular, in the optical recording medium 100 according to this embodiment, the intensity of the laser light 110 incident on the recording layer (1) 103 through the substrate (2) 109 and the transparent resin layer 105 and the intensity of the reflective light are attenuated by the recording layer (2) 108 and the reflective layer (2) 107, resulting in a decrease in reflectivity. Therefore, the upper limit of the groove depth is preferably $7\lambda/100$ or less. For example, at a write/read wavelength $\lambda$ of 660 nm, the groove depth of the substrate (1) 101 is preferably 46.2 nm or less. More preferably, the upper limit of the groove depth is $6\lambda/100$ or less.

Thus, it is preferred that the groove depth of the substrate (1) of the inverted stack 11 is shallower than that of the substrate (2) of the conventional stack 12. Specifically, the ratio of the groove depth of the substrate (1) to that of the substrate (2) is generally ⅓ or less, preferably ¼ or less, and more preferably ⅕ or less.

The groove width of the substrate (1) 101 of the inverted stack 11 is generally T/10 or more, preferably 2 T/10 or more, and more preferably 3 T/10 or more; and generally 8 T/10 or less, preferably 7 T/10 or less, and more preferably 6 T/10 or less, where T represents the track pitch. Controlling the groove width of the substrate (1) 101 ensures satisfactory tracking and sufficient reflectivity. For example, at a track pitch of 740 nm, the groove width of the substrate (1) 101 is generally 74 nm or more, preferably 148 nm or more, and more preferably 222 nm or more; and generally 592 nm or less, more preferably 518 nm or less, and more preferably 444 nm or less. In this description, the term "groove width" of a substrate means the width of a groove at the half of the maximum depth of the groove, namely, the half width.

The substrate (1) 101 should have a certain thickness and is preferably 0.3 mm or more, and generally 3 mm or less and preferably 1.5 mm or less.

<Reflective Layer (1)>

The material for the reflective layer (1) 102 of the inverted stack 11 is not particularly limited, and examples thereof include metals and semimetals such as Au, Al, Ag, Cu, Ti, Ni, Pt, Ta, Pd, Mg, Se, Hf, V, Nb, Ru, W, Mn, Re, Fe, Co, Rh, Ir, Zn, Cd, Ga, In, Si, Ge, Te, Pb, Po, Sn, Bi, and rare-earth metals. These materials may be used alone or as an alloy of any two or more thereof. Among them, Au, Al, and Ag are preferable. In particular, a metal material containing Ag at 50% or more is low in cost and high in reflectivity and is therefore preferred.

A reflective layer (1) 102 composed of an alloy containing Ag as a main component and at least one element selected from the group consisting of Ti, Zn, Cu, Pd, Au, and rare-earth metals in an amount of 0.1 to 15 atomic % is particularly preferred. In the alloy containing two or more elements selected from the group consisting of Ti, Bi, Zn, Cu, Pd, Au, and rare-earth metals, each content may be 0.1 to 15 atomic %, and preferably, the total content is within the range of 0.1 to 15 atomic %.

More preferably, the reflective layer (1) 102 is composed of an alloy containing Ag as a main component, at least one element selected from the group consisting of Ti, Bi, Zn, Cu, Pd, and Au in an amount of 0.1 to 15 atomic %, and at least one rare-earth element in an amount of 0.1 to 15 atomic % according to need. Among the rare-earth metals, neodymium is particularly preferred. Specific examples of the alloy include AgPdCu, AgCuAu, AgCuAuNd, AgCuNd, AgBi, and AgBiNd. The composition of the alloy used in this embodiment is within the above-mentioned range.

A reflective layer (1) 102 made of Au alone, which has small-sized crystal grains and exhibits high corrosion resistance, is preferred. The reflective layer (1) 102 may be made of Si. Furthermore, the reflective layer (1) 102 may be made of a material other than metals, for example, may be made of a multilayer film composed of alternately stacked low-refraction thin films and high-refraction thin films.

The reflective layer (1) 102 may be formed by sputtering, ion plating, chemical vapor deposition, or vacuum vapor deposition, for example.

The reflective layer (1) 102 of the inverted stack 11 preferably should have high reflectivity and high durability. The thickness of the reflective layer (1) 102 is generally 30 nm or more, preferably 40 nm or more, and more preferably 50 nm for ensuring high reflectivity, and is generally 400 nm or less and preferably 300 nm or less for shortening task time of the production process and reducing cost.

<Recording Layer (1)>

In general, the recording layer (1) 103 of the inverted stack 11 contains a dye so as to have the same sensitivity level as that of a recording layer used in a single-sided recording medium such as a CD-R, a DVD-R, and a DVD+R. It is preferred that the dye has a maximum absorption wavelength $\lambda$max within the wavelength range of visible light to near-infrared light from approximately 350 to 900 nm and is suitable for recording by blue to near-microwave laser light. In particular, it is preferred that dyes suitable for recording by near-infrared laser light with a wavelength of approximately 770 to 830 nm (for example, 780 nm or 830 nm) generally used in a CD-R, red laser light with a wavelength of approximately 620 to 690 nm (for example, 635 nm, 660 nm, or 680 nm) generally used in a DVD-R, and blue laser light with a wavelength of, for example, 405 nm or 515 nm. Also, phase change materials can be used.

The dye used in the recording layer (1) 103 is not particularly limited, and is generally an organic dye. Examples of the organic dye include macrocyclic aza-annulene dyes (such as phthalocyanine dyes, naphthalocyanine dyes, and porphyrin dyes), pyrromethene dyes, polymethine dyes (such as cyanine dyes, merocyanine dyes, squarylium dyes), anthraquinone dyes, azulenium dyes, metal-containing azo dyes, metal-containing indoaniline dyes. In particular, the metal—containing azo dyes have excellent recording sensitivity and light fastness and are excellent in durability. These dyes may be used alone or in the form of a mixture of any two or more thereof.

The recording layer (1) 103 may contain any component other than the dye.

For example, the recording layer (1) 103 may contain a transition metal chelate compound (such as acetylacetonate chelate, bisphenyldithiol, salicylaldehyde oxime, or bisdithio-α-diketone) as a singlet-oxygen quencher for stabilizing the recording layer and enhancing the light fastness and may contain a recording sensitizer such as a metal compound for improving recording sensitivity. The metal compound contains a metal such as a transition metal in the form of atom, ion, or cluster, and examples thereof include organic metal compounds such as ethylenediamine complexes, azomethine complexes, phenylhydroxyamine complexes, phenanthroline complexes, dihydroxyazobenzene complexes, dioxime complexes, nitrosoaminophenol complexes, pyridyltriazine complexes, acetylacetonate complexes, metallocene complexes, and porphyrin complexes. The metal atom is not particularly limited, and transition metals are preferred.

In addition, the recording layer (1) 103 may contain, for example, a binder, a leveling agent, and an anti-foaming agent. Preferable examples of the binder include polyvinyl alcohol, polyvinylpyrrolidone, nitrocellulose, cellulose acetate, ketone resins, acrylic resins, polystyrene resins, urethane resins, polyvinyl butyral, polycarbonates, and polyolefins.

It is preferred that the recording layer (1) contain these compounds in a combination with a specific dye for enhancing high-speed characteristics. This will be described below.

The recording layer (1) 103 may be formed by any process without specific limitation, and is generally formed by a common thin-film forming process, such as vacuum vapor deposition, sputtering, doctor blading, casting, spin coating, or dipping. In view of mass production and cost, wet filmforming processes such as spin coating are preferred. Alternatively, vacuum vapor deposition is preferred for forming a uniform recording layer.

When the recording layer (1) 103 is formed by spin coating, a spinning rate of 10 to 15000 rpm is preferred. In general, the solvent is removed by heating after the spin coating. Any solvent that does not damage the substrate can be used without limitation for forming the recording layer by a coating process such as doctor blading, casting, spin coating, or dipping. Examples such solvents include ketone alcohol solvents such as diacetone alcohol and 3-hydroxy-3-methyl-2-butanone; cellosolve solvents such as methyl cellosolve and ethyl cellosolve; linear hydrocarbon solvents such as n-hexane and n-octane; cyclic hydrocarbon solvents such as cyclohexane, methylcyclohexane, ethylcyclohexane, dimethylcyclohexane, n-butylcyclohexane, tert-butylcyclohexane, and cyclooctane; perfluoroalkylalcohol solvents such as tetrafluoropropanol, octafluoropentanol, and hexafluorobutanol; and hydroxycarboxylic acid ester solvents such as methyl lactate, ethyl lactate, and methyl 2-hydroxyisobutyrate.

The heating for removing the solvent is generally performed at a temperature slightly lower than the boiling point of the solvent used, in view of removing the solvent with simple equipment. The temperature is usually in the range of 60 to 100° C. The heating may be performed by any process without limitation. For example, a solution containing a dye is applied onto a substrate (1) 101 for forming a recording layer (1) 103 and the layer is left at a predetermined temperature for a predetermined time (usually for 5 min or more and preferably 10 min or more, and usually 30 min or less and preferably 20 min or less). The substrate (1) 101 may be heated by infrared or far-infrared irradiation for a short period of time (for example, from five seconds to five minutes).

In vacuum vapor deposition, for example, an organic dye and recording layer materials such as various additives according to need are placed into a crucible disposed in a vacuum container; the vacuum container is evacuated with a vacuum pump to approximately $10^{-2}$ to $10^{-5}$ Pa; and then the crucible is heated for evaporating the recording layer materials and depositing the materials on a substrate disposed so as to face the crucible.

The thickness of the recording layer (1) 103 of the inverted stack 11 is generally 40 nm or more and preferably 50 nm or more, and generally 150 nm or less and preferably 100 nm or less. Controlling the thickness of the recording layer (1) 103 within this range can prevent a decrease in sensitivity while ensuring sufficient recording signal amplitude. A recording layer (1) 103 having an excessively large thickness may impair the sensitivity.

<Barrier Layer>

A barrier layer 104 is provided with the inverted stack 11. In general, the barrier layer 104 is disposed between the recording layer (1) 103 and the transparent resin layer 105 for preventing contamination or dissolution of the recording layer (1) 103 by any substance migrating from the transparent resin layer 105.

In the present invention, in addition to the above-described purposes, the barrier layer 104 is used for facilitating heat dissipation of the recording layer 103 to reduce crosstalk in high-speed recording. Therefore, in the present invention, the barrier layer is composed of a material having a high thermal conductivity of a bulk state and has a very small thickness, unlike known high-thickness barrier layers composed of alloys or dielectric materials. Consequently, significantly improved characteristics can be obtained.

As described above, the thermal conductivity of a bulk state sharply increases at 70 W/m·K. In FIG. 2 showing a part of data of Example described below, Δjitter is lowered to 1% or less with the exception of Si and C semiconductors, by increasing the thermal conductivity to 90 W/m·K or more. Thus, significantly enhanced characteristics can be obtained. The upper limit of the thermal conductivity of the barrier layer 104 is not essential in the present invention, but the thermal conductivity of 700 W/m·K is a sufficient level. Semiconductor elements such as Si and C can obtain further favorable characteristics by alloying or admixing additives that increase the electrical conductivity.

On the other hand, as described above, a thickness of the barrier layer 104 exceeding 5 nm leads to significantly poor characteristics. Therefore, the thickness of the barrier layer 104 is generally 5 nm or less, preferably 4 nm or less, and more preferably 3.5 nm or less and is generally 0.5 nm or more, preferably 1 nm or more, and more preferably 1.5 nm or more. Among the results of elements shown in Table 2 described in [Example] below, the results of Mo and Co are exemplified in FIG. 3. The optimum values differ depending on the thermal conductivity, but Δjitter, ST (%), and MT (%) values are stably satisfactory in this range of thickness.

A highly thermal conductive thin film having ductility and malleability can be used as the barrier layer 104 by decreasing the thickness of the film, unlike a glassy dielectric film having a low thermal conductivity. Thereby, a change caused by decomposition of the dye in the recording layer can be accurately traced, and the jitter may be further reduced.

Examples of the material for the barrier layer 104 of the present invention include preferably Mg, Cr, Mn, Fe, Ni, Zn, Ru, Rh, Pd, In, Os, Ir, Pt, Me, Al, W, Co, Cr, Cu, Ag, Au, and alloys thereof; more preferably Cu, Al, Au, Co, Cr, Mo, Si, W, C, Ag, and alloys thereof; and most preferably metal elements such as Mo, W, Cu, Co, Cr, and Al and alloys containing these metal elements as main components. "A metal element as a 'main component'" means that the metal element occupies more than 50 wt % of the alloy composition. In particular, Mo, W, and Cu have significantly favorable characteristics. Co and Cr exhibit high sensitivity and satisfactorily low jitters at 4×-speed recording and 8×-speed recording. Furthermore, Ag, Al, Si, and C may be used as the barrier layer 104 having satisfactory recording characteristics and weather resistance by being alloyed or in combination of use of an improved photo-curable resin.

The present inventors have revealed that the barrier layers 104 composed of the above-mentioned exemplary materials can sufficiently prevent the diffusion of the recording layer into a photo-curable resin which is in contact with the recording layer. When the barrier layer 104 has an uneven density structure such as an island structure in the film, grain boundaries occur and grain diameters are increased. This may cause an increase in noise and film defects with a change in temperature or humidity such as high-temperature/high-humidity test. Therefore, a barrier layer 104 with a high density and a smooth structure is preferred.

The structure of the barrier layer 104 with high density and smooth structure may depend on the composition and components and further may depend on conditions for forming the barrier layer 104. The barrier layer 104 is formed by a common process, such as vacuum vapor deposition or sputtering. Sputtering is particularly preferred. In the sputtering process, for example, a target is pre-sputtered, in order to obtain a barrier layer with a high density and smooth structure. Preferably, the pre-sputtering is carried out for a time longer than that in the usual manner for removing moisture absorbed on the target and an oxide layer on the surface as much as possible, and then sputtering is performed; or the sputtering is carried out under conditions suitable for sputtering, for example, reducing the argon pressure as much as possible. Since the barrier layer 104 of the present invention is thin, the surface conditions of the barrier layer 104 will influence recording. Therefore, a film structure having high density and smoothness can improve recording characteristics.

The "thermal conductivity" values in this description are quoted from the thermal conductivity values at 300K shown in Table 1 "Debye temperature and thermal conductivity" on page 117 of "Kotai Butsurigaku Nyumon Zyou-kan (Introduction to Solid Physics I)" 6th Edition, by Kittel. The thermal conductivity values of main materials among those shown in the Table are shown in Table 1.

[Table 1]

TABLE 1

| | Thermal conductivity at 300 K (W/m·K) | | Thermal conductivity at 300 K (W/m·K) |
|---|---|---|---|
| C | 129 | Ru | 117 |
| Mg | 156 | Rh | 150 |
| Al | 237 | Pd | 72 |
| Si | 148 | Ag | 429 |
| Cr | 94 | Cd | 97 |
| Fe | 80 | In | 82 |
| Co | 100 | Sn | 67 |
| Ni | 91 | W | 174 |
| Cu | 401 | Os | 88 |
| Zn | 116 | Ir | 147 |
| Mo | 138 | Pt | 72 |
| Ti | 22 | Au | 317 |

Methods for actually measuring thermal conductivity of thin films are known, but such methods require special devices (for example, an optical AC calorimeter for measuring a thin-film thermal constant) and preparation of special samples. Therefore, these methods are not widely used, and excessive labor is required in many cases for measuring the thermal conductivity. Therefore, in the present invention, known thermal conductivity values of a bulk state are employed.

In a barrier layer 104 composed of a plurality of components, such as in an alloy layer, the bulk thermal conductivity value of the barrier layer 104 is determined by the sum of the product of the bulk thermal conductivity of each component in the composition by the rate of each component. For example, the thermal conductivity value of an alloy consisting of 95 atomic % Al and 5 atomic % Cr is calculated based on the bulk thermal conductivity (237 W/m·K) of Al and the bulk thermal conductivity (94 W/m·K) of Cr as 237×0.95+ 94×0.05=229.9 W/m·K. Similarly, thermal conductivity value of, for example, ternary or quaternary alloys can also be calculated.

Thermal conductivity values of materials not shown in the above-mentioned Table 1 "Debye temperature and thermal conductivity" on page 117 of "Kotai Butsurigaku Nyumon Zyou-kan (Introduction to Solid Physics I)" 6th Edition, by Kittel are determined on the basis of data disclosed in data bases which are thought to provide latest physical properties, such as internet WWW sites (for example, http://www.als.co.jp/thermal/db/prop_met.htm), "Rika Nenpyo (Science Data Book)" (Maruzen), and "Butsurigaku Jiten (Physics Dictionary)" (Baifukan).

Furthermore, layers composed of a material similar to that for the barrier layer 104 may be disposed between the substrate (1) 101 and the recording layer (1) 103, the substrate (2) 109 and the recording layer (2) 108, and the recording layer (2) 108 and the reflective layer (2) 107.

[Transparent Resin Layer]

Next, the transparent resin layer 105 of the inverted stack 11, which is in contact with the incident face of the laser light 110, will be described. The transparent resin layer 105 of the dual-layer optical recording medium 100 according to this embodiment is usually composed of a material having light transmissivity which allows the laser light 110 incident on the substrate (2) 109 reaching the recording layer (1) 103. Preferably, the transparent resin layer 105 composed of a transparent resin has a glass transition temperature Tg of 150° C. or more and may be made of a single layer or a plurality of layers. Such a transparent resin layer will increase the hardness of the transparent resin layer and can reduce the jitter.

Figure 1B:
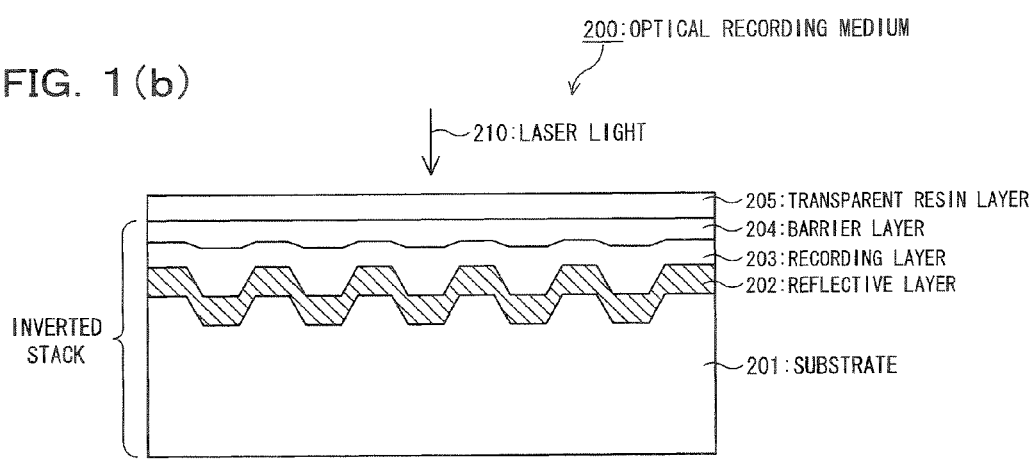
FIG. 1(b) is a schematic cross-sectional view illustrating a structure of optical recording medium according to a second embodiment of the present invention.

The elastic modulus of the resin for the transparent resin layer 105 at 30° C. is generally 1000 MPa or more, preferably 2000 MPa or more, more preferably 3000 MPa or more, and more preferably 4000 MPa or more. In a transparent resin layer 105 made of a resin having an elastic modulus of 1000 MPa or more, so-called confinement effects can be enhanced in write/read on an L1 layer (FIG. 1). The upper limit of the elastic modulus is generally 6000 MPa. By using a resin having an elastic modulus of 6000 MPa or less, for example, the transparent resin layer 105 can be formed by a solution process such as coating, which is industrially advantageous. The transparent resin layer 105 composed of a resin having an elastic modulus within the above-mentioned range can prevent excess deformation extending to the adjacent tracks during recording of optical information on the recording layer (1) 103 of the inverted stack 11. Consequently, an optical recording medium 100 having reduced crosstalk in high-speed recording on the L1 layer and having reduced jitter can be obtained. The term "transparency" in the transparent resin layer 105 means that the transparent resin layer 105 does not have a structure dispersing the laser light 110 incident on the optical recording medium 100.

It is desirable that the intervals between laminated recording layers have a sufficient distance capable of focusing on each layer. Therefore, the thickness of the transparent resin layer 105 is generally 5 μm or more and preferably 10 μm or more, depending on the mechanism of a focus servo.

An excess thickness of the transparent resin layer 105 may take a long time for adjusting the focus servo on the recording layer (1) through the transparent resin layer 105, for example. In addition, the moving distance of an objective lens may be increased. Furthermore, the curing by ultraviolet takes a long time, which may lead a decrease in productivity. In view of the above, generally, the thickness of the transparent resin layer 105 is preferably 100 μm or less.

Next, materials for the transparent resin layer 105 will be described in detail.

Examples of the material for the transparent resin layer 105 include thermoplastic resins, thermosetting resins, electron beam-curable resins, and ultraviolet-curable resins (including delayed curable types). The transparent resin layer 105 is formed of any material selected from these materials. A transparent resin layer 105 made of a thermoplastic resin or a thermosetting resin can be formed by application of a coating solution prepared by dissolving a resin in an appropriate solvent according to need and drying (heating) the solution. A transparent resin layer 105 made of an ultraviolet-curable resin can be formed by application of a resin or a coating solution prepared by dissolving a resin in a solvent and then curing the resin by ultraviolet irradiation. These materials may be used alone or in a combination thereof.

The transparent resin layer 105 is usually formed by a coating process such as spin coating or casting, preferably, by spin coating. In a resin having high viscosity, the transparent resin layer 105 may be formed by screen printing. In the ultraviolet-curable resins, a resin in the form of liquid at 20° C. to 40° C. can be applied without solvent, which can increase productivity and is therefore preferred. In general, it is preferred that the viscosity of a coating solution be adjusted in the range of 20 mPa·s to 1000 mPa·s.

Among the materials for the transparent resin layer 105, the ultraviolet-curable resins are preferred because they have high transparency and short curing time and are therefore advantageous in manufacturing. Examples of the ultraviolet-curable resins include radical ultraviolet-curable resins and cationic ultraviolet-curable resins, and both of them can be used.

Examples of the radical ultraviolet-curable resins include compositions containing ultraviolet-curable compounds and photopolymerization initiators as essential components.

The ultraviolet-curable compound may contain a monofunctional (meth)acrylate or a polyfunctional (meth)acrylate as a polymerizable monomer component. These components may be used alone or in combination of two or more. In this description, "acrylate" and "methacrylate" are collectively referred to as "(meth)acrylate".

Examples of the monofunctional (meth)acrylate include (meth)acrylates having substitutional groups such as methyl, ethyl, propyl, butyl, amyl, 2-ethylhexyl, octyl, nonyl, dodecyl, hexadecyl, octadecyl, cyclohexyl, benzyl, methoxyethyl, butoxyethyl, phenoxyethyl, nonylphenoxyethyl, tetrahydrofurfuryl, glycidyl, 2-hydroxyethyl, 2-hydroxypropyl, 3-chloro-2-hydroxypropyl, dimethylaminoethyl, diethylaminoethyl, nonylphenoxyethyltetrahydrofurfuryl, caprolactone-modified tetrahydrofurfuryl, isobornyl, dicyclopentanyl, dicyclopentenyl, and dicyclopentenyloxyethyl.

Examples of the polyfunctional (meth)acrylate include di(meth)acrylates of, for example, 1,3-butylene glycol, 1,4-butanediol, 1,5-pentanediol, 3-methyl-1,5-pentanediol, 1,6-hexanediol, neopentyl glycol, 1,8-octanediol, 1,9-nonanediol, tricyclodecanedimethanol, ethylene glycol, polyethylene glycol, propylene glycol, dipropylene glycol, tripropylene glycol, and poly(propylene glycol); and tris(2-hydroxyethyl)isocyanurate di(meth)acrylate.

Other examples include diol di(meth)acrylates prepared by addition of at least 4 mol of ethylene oxide or propylene oxide to 1 mol of neopentylglycol; diol di(meth)acrylates prepared by addition of 2 mol of ethylene oxide or propylene oxide to 1 mol of bisphenol A; triol di- or tri(meth)acrylates prepared by addition of at least 3 mol of ethylene oxide or propylene oxide to 1 mol of trimethylolpropane; diol di(meth)acrylates prepared by addition of at least 4 mol of ethylene oxide or propylene oxide to 1 mol of bisphenol A; trimethylolpropane tri(meth)acrylates; pentaerythritol tri(meth)acrylates; dipentaerythritol poly(meth)acrylates; ethylene oxide modified phosphoric acid (meth)acrylates; and ethylene oxide modified alkylated phosphoric acid (meth)acrylates.

A polymerizable oligomer may be used together with the polymerizable monomer. Examples of the polymerizable oligomer include polyester (meth)acrylates, polyether (meth)acrylates, epoxy (meth)acrylates, and urethane (meth)acrylates.

Among the photopolymerization initiators, preferred are molecular cleavage type photopolymerization initiators and hydrogen abstraction type photopolymerization initiators.

Examples of the molecular cleavage type photopolymerization initiator include benzoin isobutyl ether, 2,4-diethylthioxanthone, 2-isopropylthioxanthone, benzil, 2,4,6-trimethylbenzoyldiphenylphosphine oxide, 2-benzyl-2-dimethylamino-1-(4-morpholinophenyl)-butan-1-one, and bis(2,6-dimethoxybenzoyl)-2,4,4-trimethylpentylphosphine oxide. In addition, for example, 1-hydroxycyclohexyl phenyl ketone, benzoin ethyl ether, benzyldimethylketal, 2-hydroxy-2-methyl-1-phenylpropan-1-one, 1-(4-isopropylphenyl)-2-hydroxy-2-methylpropan-1-one, or 2-methyl-1-(4-methylthiophenyl)-2-morpholinopropan-1-one may be used simultaneously.

Examples of the hydrogen abstraction type photopolymerization initiator include benzophenone, 4-phenylbenzophenone, isophthalphenone, and 4-benzoyl-4'-methyl-diphenyl sulfide.

In addition, a sensitizer may be used with the photopolymerization initiator. Examples of the sensitizer include trimethylamine, methyldiethanolamine, triethanolamine, p-dimethylaminoacetophenone, ethyl p-dimethylaminobenzoate, isoamyl p-dimethylaminobenzoate, N,N-dimethylbenzylamine, and 4,4'-bis(diethylamino)benzophenone.

The cationic ultraviolet-curable resin is composed of, for example, a cationic polymerizable photoinitiator and an epoxy resin. Examples of the epoxy resin include bisphenol A-epichlorohydrin epoxy, alicyclic epoxy, long chain aliphatic epoxy, brominated epoxy, glycidyl ester epoxy, glycidyl ether epoxy, and heterocyclic epoxy resins. An epoxy resin containing low contents of free chlorine and chlorine ions is preferred. The amount of chlorine is preferably 1 wt % or less and more preferably 0.5 wt % or less.

The content of the cationic polymerizable photoinitiator is generally 0.1 parts by weight or more and preferably 0.2 parts by weight or more, and usually 20 parts by weight or less and preferably 5 parts by weight or less for 100 parts by weight of a cationic ultraviolet-curable resin. Furthermore, a known photosensitizer may be simultaneously used in order to more effectively utilize the light in near-ultraviolet and visible regions from wavelength range of an ultraviolet light source. Examples of the photosensitizer include anthracene, phenothiazine, benzyl methyl ketal, benzophenone, and acetophenone.

The ultraviolet-curable resin may be blended with other additives according to need for enhancing various properties. Examples of the other additives include thermal polymerization inhibitors; antioxidants such as hindered phenols, hindered amines, and phosphites; plasticizers; and silane coupling agents such as epoxysilanes, mercaptosilanes, and (meth)acrylsilanes. These additives should have high solubility in ultraviolet-curable compounds and not inhibit ultraviolet permeability.

The transparent resin layer 105 of the optical recording medium 100 of the present invention may obtain a relatively high elastic modulus by any process. In general, a relatively high elasticity can be obtained by the following process. For example, a process increasing the amount of a monomer having two or more and preferably three or more methacryloyl groups in the above-described ultraviolet-curable resin; a process increasing the amount of a high molecular weight diol having a side chain such as polyester diol and being mixed with a linear high molecular weight diol; a process decreasing the molecular weight of a side chain of an oligomer component having a main chain comprising a hard segment to increase intramolecular binding; or a process adding a predetermined amount of a crosslinking agent such as a polyisocyanate compound, an amino resin, an epoxy compound, a silane compound, or a metal chelate compound.

In particular, in order to obtain a resin having sufficiently high hardness, it is preferred to use multifunctional (meth)acrylates such as trimethylolpropane tri(meth)acrylate; triol tri(meth)acrylates prepared by addition of at least 3 mol of ethylene oxide or propylene oxide to 1 mol of trimethylolpropane; pentaerythritol tri- or tetra(meth)acrylate; tetraol tri- or tetra(meth)acrylates prepared by addition of at least 4 mol of ethylene oxide or propylene oxide to 1 mol of pentaerythritol; dipentaerythritol penta- or hexa(meth)acrylate; and hexaol penta- or hexa(meth)acrylates prepared by addition of at least 6 mol of ethylene oxide or propylene oxide to 1 mol of dipentaerythritol. Such resins can have preferred characteristics such as a high crosslinking density and a high contraction coefficient.

Among the above-mentioned resins, trimethylolpropane tri(meth)acrylates, pentaerythritol tri(meth)acrylates, pentaerythritol tetra(meth)acrylates, dipentaerythritol penta(meth)acrylates, dipentaerythritol hexa(meth)acrylates are particularly preferred.

In addition, examples of the acrylates include norbornane dimethanol diacrylate; norbornane diethanol di(meth)acrylate; diol di(meth)acrylates prepared by addition of 2 mol of ethylene oxide or propylene oxide to norbornane dimethanol; tricyclodecane dimethanol di(meth)acrylate; tricyclodecane diethanol di(meth)acrylate; diol di(meth)acrylates prepared by addition of 2 mol of ethylene oxide or propylene oxide to tricyclodecanedimethanol; pentacyclodecane dimethanol di(meth)acrylate; pentacyclopentadecane diethanol di(meth)acrylate; diol di(meth)acrylates prepared by addition of 2 mol of ethylene oxide or propylene oxide to pentacyclopentadecane dimethanol; and diol di(meth)acrylates prepared by addition of 2 mol of ethylene oxide or propylene oxide to pentacyclopentadecane diethanol. In particular, acrylates having crosslinking structures containing rigid cyclic structures are preferred as high elastic-modulus resins. Examples of such resins include tricyclodecane dimethanol di(meth)acrylate, pentacyclopentadecane dimethanol di(meth)acrylate, tricyclodecane dimethanol di(meth)acrylate, bis(2-acryloyloxyethyl)hydroxyethyl isocyanurate, bis(2-acryloyloxypropyl)hydroxypropyl isocyanurate, bis(2-acryloyloxybutyl)hydroxybutyl isocyanurate, bis(2-methacryloyloxyethyl)hydroxyethyl isocyanurate, bis(2-methacryloyloxypropyl)hydroxypropyl isocyanurate, bis(2-methacryloyloxybutyl)hydroxybutyl isocyanurate, tris(2-acryloyloxyethyl) isocyanurate, tris(2-acryloyloxypropyl) isocyanurate, tris(2-acryloyloxybutyl) isocyanurate, tris(2-methacryloyloxyethyl) isocyanurate, tris(2-methacryloyloxypropyl) isocyanurate, and tris(2-methacryloyloxybutyl) isocyanurate.

Among them, tricyclodecane dimethanol di(meth)acrylate and tricyclopentadecane diethanol di(meth)acrylate are particularly preferred.

Furthermore, any combination of an acrylic monomer increasing crosslinking density and an acrylic monomer having a crosslinking structure containing a rigid cyclic structure is preferred.

Among the ultraviolet-curable resins, cationic ultraviolet-curable resins, which have low light scattering and low viscosity and can be applied by spin coating, are preferred. A variety of radical ultraviolet-curable resins are available.

These can be used in various blending ratios and compositions and do not undergo curing inhibition by oxygen when the transparent resin layer 105 has a thickness of 10 pm or more. The radical ultraviolet-curable resins are therefore preferred.

[Conventional Stack]

Next, each layer of the conventional stack 12 will be described. As described above, the conventional stack 12 includes a substrate (2) 109; and a recording layer (2) 108, a reflective layer (2) 107, and a protective coat layer 106 which are laminated on the substrate (2) 109 (hereinafter, the recording layer (2) 108, the reflective layer (2) 107, and the protective coat layer 106 are collectively referred to as "L0 layer").

<Substrate (2)>

The substrate (2) 109 of the conventional stack 12 is composed of a similar material to that of the substrate (1) 101 of the inverted stack 11, but is required to be light transmissive. The groove width of the substrate (2) 109 is generally 2 T/10 or more and preferably 3 T/9 or more, where T represents the track pitch. Controlling the groove width within this range ensures sufficient reflectivity. For example, at a track pitch of 740 nm, the groove width of the substrate (2) 109 is generally 148 nm or more and preferably 246 nm or more. The groove width of the substrate (2) 109 is generally 7 T/10 or less and preferably 6 T/10 or less. For example, at a track pitch of 740 nm, the groove width of the substrate (2) 109 is generally 518 nm or less and preferably 444 nm or less, and controlling the groove width within this range ensures favorable replication of the groove shape.

The depth of the grooves of the substrate (2) 109 is generally $\lambda/10$ or more, where $\lambda$ is the write/read light wavelength. Controlling the groove depth within this range ensures sufficient reflectivity and is therefore preferred. The depth of the grooves is preferably $\lambda/8$ or more and more preferably $\lambda/6$ or more. For example, for a wavelength $\lambda$ of the write/read light (write/read wavelength) of 660 nm, the groove depth of the substrate (2) 109 is generally 66 nm or more, preferably 82.5 nm or more, and more preferably 110 nm or more. The upper limit of the groove depth of the substrate (2) 109 is generally $2\lambda/5$ or less for achieving favorable replication of the groove shape, and is preferably $2\lambda/7$ or less. For example, at a write/read wavelength of 660 nm, the groove depth is generally 264 nm or less and preferably 188.6 nm or less.

<Recording Layer (2)>

The recording layer (2) 108 of the conventional stack 12 contains a similar dye to that of the recording layer (1) 103 of the inverted stack 11. The thickness of the recording layer (2) 108 of the conventional stack 12 varies depending on the recording process and is not specifically limited, and is generally 20 nm or more, preferably 30 nm or more, and more preferably 40 nm or more for obtaining sufficient recording modulation. However, in order to transmit light, the thickness is generally 200 nm or less, preferably 180 nm or less, and more preferably 150 nm or less. The thickness of the recording layer (2) 108 is that of the thick portion (the thickness of the recording layer (2) 108 at the groove of the substrate (2) 109).

<Reflective Layer (2)>

The reflective layer (2) 107 of the conventional stack 12 is composed of a similar material to that of the reflective layer (1) 102 of the inverted stack 11, and is required to less absorb the write/read laser light 110 incident on the substrate (2) 109 and to generally have a light transmissivity of 40% or more and a light reflectivity of 30% or more. For example, the reflective layer (2) 107 can obtain an appropriate light transmissivity by being thinly formed with a metal having a high reflectivity. It is desirable that the reflective layer (2) 107 exhibit some corrosion resistance. Furthermore, it is desirable that the reflective layer (2) 107 have shielding properties to prevent the recording layer (2) 108 disposed below the reflective layer (2) 107 from influence by any substance migrating from the layer (here, the transparent resin layer 105) above the reflective layer (2) 107.

The thickness of the reflective layer (2) 107 is generally 50 nm or less, preferably 30 nm or less, and more preferably 25 nm or less for securing the light transmissivity of 40% or more. In order to secure a moderate light reflectivity of 30% or more, the thickness of the reflective layer (2) 107 is generally 3 nm or more and preferably 5 nm or more.

<Protective Coat Layer>

The protective coat layer 106 of the forward laminate 12 is disposed on the reflective layer (2) 107 at the transparent resin layer 105 side in order to prevent the reflective layer (2) 107 from oxidation, dust contamination, and chipping, for example. Any material which can protect the reflective layer (2) 107 can be used for the protective coat layer 106. Examples of organic materials include thermoplastic resins, thermosetting resins, electron beam-curable resins, and ultraviolet-curable resins. Examples of inorganic materials include dielectric materials such as silicon oxide, silicon nitride, magnesium fluoride ($MgF_2$), and tin(IV) oxide ($SnO_2$) In particular, to stack an ultraviolet-curable resin layer is preferred. The thickness of the protective coat layer 106 is generally 1 µm or more and preferably 3 µm or more, and generally 100 µm or less, preferably 30 µm or less, and more preferably 10 µm or less. In a protective coat layer 106 having a thickness less than this range, curing may be inhibited by oxygen. On the other hand, a protective coat layer 106 having a thickness higher than this range may cause warping of the disk and uneven thickness. Since the protective coat layer 106 is not essential, the transparent resin layer 105 may be disposed directly on the reflective layer (2) 107.

On the optical recording medium of this embodiment, information such as address information, medium type information, recording pulse conditions, and optimum recording power can be recorded. These types of information may be recorded according to standard formats such as LPP and ADIP for DVD-Rs or DVD+Rs.

Second Embodiment

FIG. 1(*b*) is a schematic cross-sectional view illustrating a structure of an optical recording medium according to a second embodiment of the present invention. FIG. 1(*b*) shows a film surface incident type optical recording medium 200 in which optical information is written/read by light incident on the opposite side of the substrate. As shown in FIG. 1(*b*), the optical recording medium 200 includes an inverted stack composed of a substrate 201, a reflective layer 202 disposed on the substrate 201, a recording layer 203 laminated on the reflective layer 202, and a barrier layer 204 provided for protecting the recording layer 203; and a transparent resin layer 205 stacked on the inverted stack at a side on which laser light 210 is incident. In the optical recording medium 200, information is written and read by the laser light 210 incident on the recording layer 203 through the transparent resin layer 205.

The substrate 201 constituting the inverted stack is formed by a similar material to that of the substrate (1) 101 of the inverted stack 11 in the optical recording medium 100 of the first embodiment. Similarly, the reflective layer 202, the recording layer 203, and the barrier layer 204 may be formed of similar materials to those described in the reflective layer (1) 102, the recording layer (1) 103, and the barrier layer 104 of the inverted stack 11 in the optical recording medium 100 of the first embodiment. The thickness and other characteristics of each layer are similar to those described in the optical recording medium 100.

Furthermore, the transparent resin layer 205 is formed of a similar material to that of the transparent resin layer 105 in the optical recording medium 100 described above. The elastic modulus and thickness of the transparent resin layer 205 are controlled within the same ranges as those of the transparent resin layer 105 in the optical recording medium 100 of the first embodiment.

In addition, in the above-described embodiments, optional layers may be disposed between these layers with the provision that the functions of the optical recording medium 100 are not impaired.

[Fundamental Concept 2 of the Invention]

A second optical recording medium according to the present invention will now be described. In particular, the description focuses on the structure of a second-layer recording layer of a dual-layer optical recording medium.

The dual-layer optical recording medium, which is the second optical recording medium of the present invention, includes a first reflective layer, a dye-containing first recording layer, and a transparent resin layer laminated in this order on a substrate (referred to as "first substrate") and a second reflective layer, a second recording layer, and a transparent substrate (referred to as "second substrate") laminated in this order on the transparent resin layer.

The above-mentioned fundamental concept will be described in detail with reference to FIG. 1(a) and FIG. 5.

Figure 5:
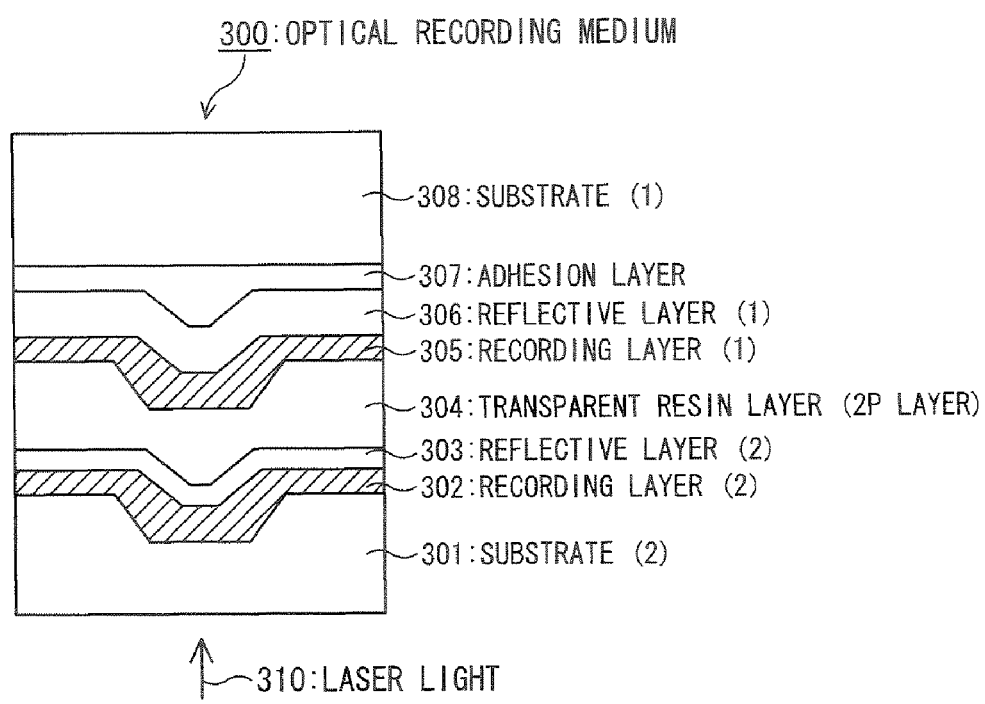
FIG. 5 is a schematic cross-sectional view illustrating the structure of an optical recording medium according to a third embodiment of the present invention.

That is, "substrates (1)" shown in FIG. 1(a) and FIG. 5 correspond to the "first substrates".

"Reflective layers (1)" shown in FIG. 1(a) and FIG. 5 correspond to the "first reflective layers".

Similarly, "recording layers (1)" shown in FIG. 1(a) and FIG. 5 correspond to the "first recording layers".

"Reflective layers (2)" shown in FIG. 1(a) and FIG. 5 correspond to the "second reflective layers".

Similarly, "recording layers (2)" shown in FIG. 1(a) and FIG. 5 correspond to the "second recording layers".

"Substrates (2)" shown in FIG. 1(a) and FIG. 5 correspond to the "transparent substrates", that is the "second substrates".

The first recording layer (second-layer recording layer) contains a dye comprising at least a metal-complex azo dye (hereinafter referred to as "metal-complex azo dye represented by formula (1)") composed of an azo compound represented by the following formula (1) and a Zn ion.

[Formula 2]

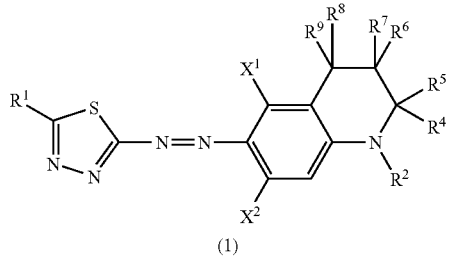

(1)

where $R^1$ denotes a hydrogen atom or an ester group represented by $CO_2R^3$ (where $R^3$ denotes a linear or branched alkyl group or a cycloalkyl group);

$R^2$ denotes a linear or branched alkyl group;

at least one of $X^1$ and $X^2$ denotes an $NHSO_2Y$ group (where Y denotes a linear or branched alkyl group containing at least two substituted fluorine atoms) and $X^1$ or $X^2$ not being the $NHSO_2Y$ group is a hydrogen atom;

$R^4$ and $R^5$ independently denote a hydrogen atom, a linear or branched alkyl group, or a linear or branched alkoxy group; and $R^6$, $R^7$, $R^8$, and $R^9$ independently denote a hydrogen atom or an alkyl group having one or two carbon atoms;

with the proviso that the $NHSO_2Y$ group is modified to an $NSO_2Y^-$ (anionic) group by $H^+$ dissociation and that the azo compound represented by the formula (1) forms a coordinate bond with the metal ion.

$R^3$ is preferably a linear or branched alkyl group having one to four carbon atoms, such as an ethyl group, a propyl group, an isopropyl group, a butyl group, an isobutyl group, a t-butyl group, or a sec-butyl group; or a cycloalkyl group having three to eight carbon atoms, such as a cyclopropyl group, a cyclobutyl group, a cyclopentyl group, a cyclohexyl group, or a cycloheptyl group. In particular, a linear alkyl group having one or two carbon atoms, such as a methyl group and an ethyl group, and a cycloalkyl group having three to six carbon atoms, such as a cyclopentyl group and a cyclohexyl group, which exhibit low steric hindrance, are preferred.

$R^2$ is preferably a linear alkyl group having one to six carbon atoms, such as a methyl group, an ethyl group, a propyl group, a butyl group, a pentyl group, or a hexyl group; or a branched alkyl group having three to eight carbon atoms, such as an isopropyl group, a sec-butyl group, an isobutyl group, a t-butyl group, a 2-ethylhexyl group, a cyclopropyl group, or a cyclohexylmethyl group.

Y denotes a linear or branched alkyl group containing at least substituted two fluorine atoms. The linear or branched alkyl group preferably has one to six carbon atoms and more preferably has one to three carbon atoms.

Each of $R^4$ and $R^5$ is preferably a hydrogen atom, a linear alkyl group having one to six carbon atoms, or an alkoxy group having one to eight carbon atoms; and more preferably a hydrogen atom, an alkyl group having one or two carbon atoms, or an alkoxy group having one or two carbon atoms. It is preferred that the alkyl group and the alkoxy group do not contain a substituent. Each of $R^4$ and $R^5$ is most preferably a hydrogen atom, a methyl group, an ethyl group, or a methoxy group.

$R^6$, $R^7$, $R^8$, and $R^9$ independently denote a hydrogen atom or an alkyl group having one or two carbon atoms. Such a hydrogen atom or an alkyl group having one or more carbon atoms helps ready control of the absorbance and refraction to predetermined values. The alkyl group having one or two carbon atoms may have a substituent (for example, a halogen atom) substituted for a hydrogen atom bonded to a carbon atom, but preferably does not have any substituent. Examples of the alkyl group having one or two carbon atoms include a methyl group and an ethyl group. In view of ease of synthesis and steric hindrance, $R^6$, $R^7$, $R^8$, and $R^9$ are each most preferably a hydrogen atom.

It is recognized that the metal-complex azo dye according to the formula (1) has (i) an appropriate calorific value and (ii) absorption in an appropriate wavelength region (the inventors recognize that at least these factors (i) and (ii) contribute to heat-mode reaction), and (iii) a high deactivation rate of an excited state compared with other metal-complex azo dyes (the inventors recognize that the factor (iii) contributes to photon-mode reaction). As a result, a favorable balance in decomposition reaction can be achieved between the heat-mode and the photon-mode, resulting in potential decreases in jitter and crosstalk. Therefore, the metal-complex azo dye contained in the second-layer recording layer in the dual-layer optical recording medium provides a significant benefit. As described above, conventional dual-layer optical recording media tend to have high-level jitter and crosstalk. In the reverse laminate having the second-layer recording layer, it is preferred that the groove depth be shallower than that of known grooves for achieving sufficiently high reflectivity. However, such a shallow groove serves as one factor to increase jitter and crosstalk. In addition, in the recording on the land region of the substrate, as described above, the recording layer must have a large thickness in order to achieve a sufficient degree of recording modulation. Such a thick recording layer is another factor to increase jitter and crosstalk. In addition, the jitter and the crosstalk tend to be increased with an increase in recording speed. In a dual-layer optical recording medium produced by the 2P process according to a third embodiment described below, the 2P layer may have an uneven thickness and curing shrinkage that lead to optical distortion and warping.

These may cause deformation of the recording laser beams, offset of beam traveling optical paths in the recording portion, and increases in jitter and crosstalk, in particular, in high-speed recording. Therefore, the addition of the metal-complex azo dye represented by the formula (1) to the second-layer recording layer (the recording layer placed remote from the incident side of the laser light) of the dual-layer optical recording medium produced by the 2P process can achieve significant effects.

The metal-complex azo dye represented by the formula (1) can exhibit high refraction in the recording laser wavelength as a result of combination of the ligand and a metal. The metal-complex azo dye represented by the formula (1) exhibits at least a predetermined calorific value. Furthermore, when an excited state is generated by the recording light by combining a central metal ion with $Zn^{2+}$, the radiation transition probability would increase or decomposition would proceed at a very high rate by energy transfer with another molecule, without undergoing much non-radiation transition. In other words, in a recording layer containing the metal-complex azo dye represented by the formula (1), the decomposition, i.e., the formation of a recording portion is completed within a very short time. Consequently, disturbances, such as those described above, in high-speed recording are reduced and satisfactorily high speed recording with decreased jitter and crosstalk can be readily achieved in the second-layer recording layer of the dual-layer optical recording medium.

Such a decrease in jitter can be recognized by, for example, enlarged asymmetry margin of jitter. The decrease in crosstalk can be recognized by the MT % and ST % values, already described, and can also be recognized by enlarged asymmetry margin.

Examples of the metal-complex azo dye represented by the formula (1) include the following dyes:

[Formula 3]

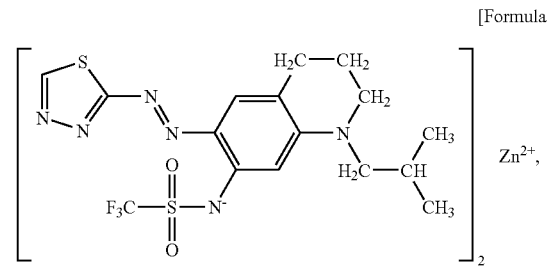

[Formula 4]

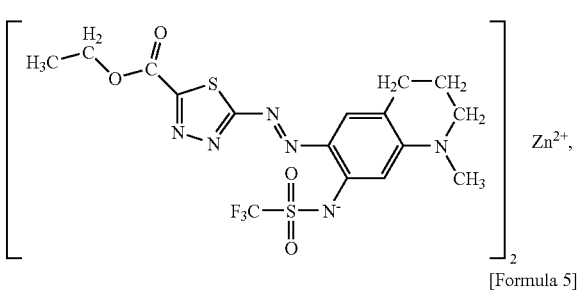

[Formula 5]

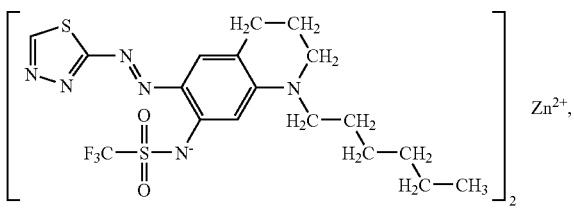

[Formula 6]

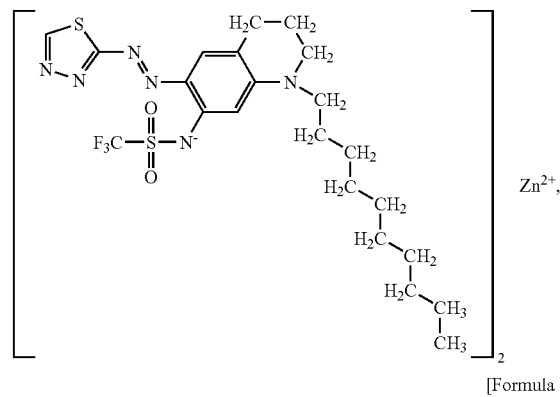

[Formula 7]

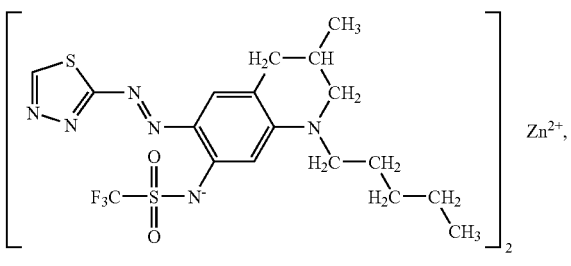

[Formula 8]

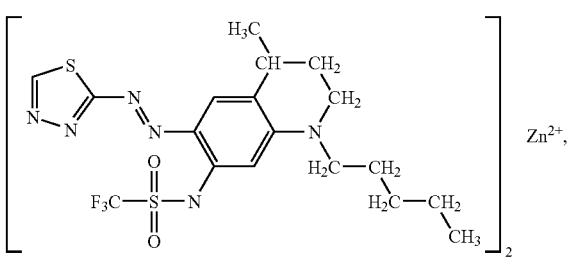

[Formula 9]

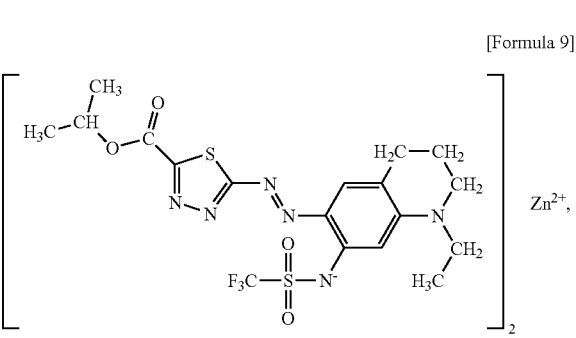

[Formula 10]

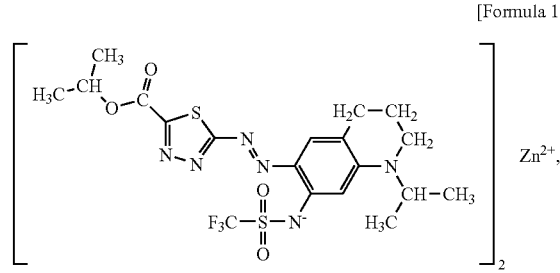

and

[Formula 11]

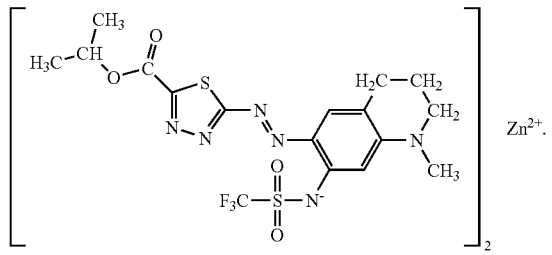

Third Embodiment

Next, an embodiment (hereinafter referred to as "third embodiment of the present invention") of the second optical recording medium of the present invention will be described.

FIG. 5 is a schematic cross-sectional view illustrating the structure of an optical recording medium according to a third embodiment of the present invention. The optical recording medium 300 shown in FIG. 5 includes a dye-containing recording layer (2) 302 (a second recording layer), a semi-transparent reflective layer (2) 303 (a second reflective layer), a transparent resin layer 304, a dye-containing recording layer (1) 305 (a first recording layer), a reflective layer (1) 306 (a first reflective layer), an adhesion layer 307, and a substrate (1) 308 (a first substrate) in this order on a disk substrate (2) 301 (a second substrate). Optical information is written on and read from the recording layer (2) 302 and the recording layer (1) 306 by laser light 310 incident on the substrate (2) 109. The substrate (2) 301, the recording layer (2) 302, and the reflective layer (2) 303 are collectively referred to as "conventional stack". The recording layer (1) 305 corresponds to the above-mentioned "second-layer recording layer".

The details of materials and forming processes of the substrate (2) 301, the recording layer (2) 302, and the reflective layer (2) 303 are similar to those of the substrate (2) 109, the recording layer (2) 108, and the reflective layer (2) 107 of the optical recording medium 100 described in the [First embodiment].

Then, the transparent resin layer 304 is formed on the reflective layer (2) 303, usually, by the 2P (photo polymerization) process. In the 2P process, guide grooves are generally formed on the transparent resin layer 304 (referred to "intermediate layer") by the following procedure:

A photo-curable resin, which is cured by light such as ultraviolet, is applied on the reflective layer (2) 303 to form a resin material layer. Then, a stamper with an asperity pattern for replication (referred to as "replication asperity pattern") is disposed on the resin material layer. The photo-curable resin is cured, and then, the stamper is detached. Thus, the asperity pattern of the stamper is transferred on the surface of the photo-curable resin. As a result, a transparent resin layer 304 (2P layer) having the asperity pattern of guide grooves can be formed by the cured photo-curable resin. In this case, a sufficient reflectivity can be obtained by controlling the depth of the guide grooves within the range of from $\lambda/100$ to $\lambda/6$, where "$\lambda$" is the write/read wavelength of the laser light 310.

The stamper may be, for example, a cyclic polyolefin or polystyrene resin.

The photo-curable resin used as the material for the transparent resin layer 304 may be, for example, an electron beam-curable resin or an ultraviolet-curable resin disclosed as the material for the transparent resin layer 105 of the optical recording medium 100 described in the [First embodiment].

Then, the recording layer (1) 305, which is the second-layer recording layer, is formed on the transparent resin layer 304. The recording layer (1) 305 at least contains the metal-complex azo dye represented by the formula (1). The metal-complex azo dye represented by the formula (1) may be used alone or in an arbitrary combination of two or more at an arbitrary proportion. Furthermore, other one or more dyes may be contained together with one or more of the metal-complex azo dye represented by the formula (1). Any dye can be contained together with the metal-complex azo dye represented by the formula (1). The dyes are the same as those contained in the recording layer (1) 103 of the optical recording medium 100 described in the [First embodiment]. The details, such as a material and a forming process, other than the dye of the recording layer (1) 305 are also similar to those of the recording layer (1) 103 of the optical recording medium 100 described in the [First embodiment]

Then, the reflective layer (1) 306 is formed on the recording layer (1) 305. The details of a material and a forming process of the reflective layer (1) 306 are similar to those of the reflective layer (1) 102 of the optical recording medium 100 described in the [First embodiment]

Then, the substrate (1) 308 is formed on the reflective layer (1) 306. The details of a material of the substrate (1) 308 are similar to those of the substrate (1) 101 of the optical recording medium 100 described in the [First embodiment] The substrate (1) 308 may be formed on the reflective layer (1) 306 by any process, and is usually formed by, as shown in FIG. 5, bonding the previously prepared substrate (1) 308 on the reflective layer (1) 306 through the adhesion layer 307.

Any material can be used as the adhesion layer 307, and examples of the material include various curable resins similar to any curable resins for the transparent resin layer 105 of the optical recording medium 100 described in the [First embodiment] and also known various types of adhesives and pressure-sensitive adhesive double-sided tapes.

When the adhesion layer 307 is composed of a curable resin, the substrate (1) 308 is adherent to the reflective layer (1) 306 through the adhesion layer 307 by forming a layer (curable resin material layer) composed of the curable resin on the reflective layer (1) 306 by a similar coating process to that in the transparent resin layer 105 of the optical recording medium 100 described in the [First embodiment]; placing the substrate (1) 308 on the curable resin material layer; and curing the curable resin during or after pressing under curing conditions for the curable resin (ultraviolet or radiation irradiation in the case of an ultraviolet-curable resin or radiation-curable resin, heating in the case of a thermosetting resin) to form the adhesion layer 307 consisting of the curable resin.

When the adhesion layer 307 is composed of an adhesive, the adhesive is applied onto the reflective layer (1) 306 by a process such as screen printing; the substrate (1) 308 is placed on the adhesive film; and then the adhesion layer 307 is formed by pressing to adhere the substrate (1) 308 to the reflective layer (1) 306 through the adhesion layer 307.

When the adhesion layer 307 is a double-sided tape (for example, pressure-sensitive adhesive double-sided tape), the substrate (1) 308 is adherent to the reflective layer (1) 306 through the adhesion layer 307 by pressing the reflective layer (1) 306 and the substrate (1) 308 with the pressure-sensitive adhesive double-sided tape therebetween.

The light transmissivity of the thus formed adhesion layer 307 is not specifically limited, i.e., the adhesion layer 307 may be transparent or opaque. The thickness of the adhesion layer 307 is not specifically limited, and is generally 1 μm or more and preferably 3 μm or more, and generally 300 μm or less and preferably 100 μm or less.

The optical recording medium 300 according to the third embodiment of the present invention is described above, but the third embodiment is not limited to this and may have an arbitrary modification.

For example, the optical recording medium 300 may have additional layers between each of the layers. Examples of the additional layers include a protective coat layer disposed between the reflective layer (2) 303 and the transparent resin layer 304, and a barrier layer disposed between the transparent resin layer 304 and the recording layer (1) 305. The details of materials and forming processes of the protective coat layer and the barrier layer are similar to those of the protective coat layer 106 and the barrier layer 104 of the optical recording medium 100 described in the [First embodiment].

EXAMPLES

The embodiments of the present invention will now be described in more detail with reference to examples (Experimental Examples), however, not limited to the following examples (Experimental Examples) within the scope of the present invention.

Experimental Condition

In Experimental Examples 1, 2, and 4 described below, dual-layer optical recording media having inverted stack(optical recording media having the structure shown in FIG. 1(*a*)) were prepared. The MT (%) and the ST (%) of optical information recorded on the recording layer (1) constituting the inverted stack were measured.

Preparation of Optical Recording Medium

<Preparation of Inverted Stack>

First, substrates (1) each having a diameter of 120 mm and a thickness of 0.60 mm and each having grooves with a width of 340 nm and a depth of 28 nm arranged at a pitch of 0.74 μm were formed by injection molding of polycarbonate using a Ni stamper with a groove pattern on the surface. Then, a reflective layer (1) having a thickness of 80 nm was formed by sputtering an Ag—Bi—Nd alloy on the substrate (1). A tetrafluoropropanol solution containing an organic dye compound mixture (concentration: 2 wt %) of metal-complex azo dyes A and B (dye A:dye B=50 wt %: 50 wt %) represented by the following formulae was prepared. This solution was dropwise applied and spin-coated on the reflective layer (1) and then dried at 70° C. for 30 min to form a recording layer (1). The thickness of the recording layer (1) at the grooves on the substrate (1) (the thickness of the recording layer at the grooves of the inverted stack in FIG. 1(*a*), namely, at regions remote from the incident laser light) was about 70 nm, and the thickness of the recording layer (1) at the land regions on the substrate (1) (the thickness of the recording layer at the land regions of the reverse laminate in FIG. 1(*a*), namely, at regions near the incident laser light) was about 60 nm. The OD value of the recording layer was 1.20.

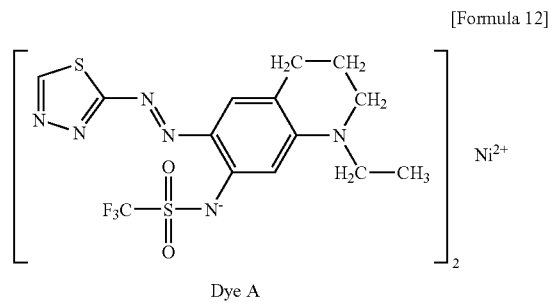

Dye A [Formula 12]

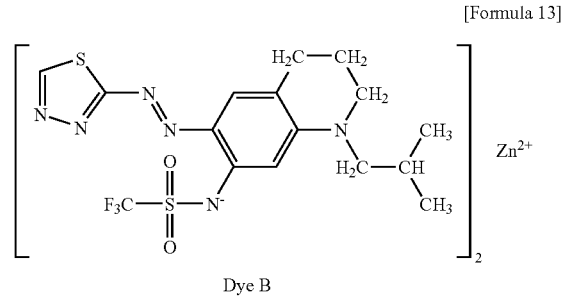

Dye B [Formula 13]

Then, immediately after the formation of the recording layer (1), a barrier layer having a composition shown in Table 2 of [Experimental Example 1] described below was formed on this recording layer (1) by sputtering. The thickness of the barrier layer was adjusted to 2 nm by controlling the sputtering time. Before the sputtering, pre-sputtering described before was performed. Thus, an inverted stack disk 1 was prepared.

<Preparation of Conventional Stack>

Polycarbonate substrates (2) each having guide grooves with a depth of 160 nm and a width of 360 nm arranged at a track pitch of 740 nm were formed. Then, a tetrafluoropropanol solution containing a mixture (concentration: 2 wt %) of the metal-complex azo dye A and the metal-complex azo dye C represented by the following formula (dye A:dye C=10 wt %:90 wt %) was dropwise applied and spin-coated on the face with the guide grooves of this substrate (2) and was then dried at 70° C. for 30 min to form a recording layer (2). The thickness of this recording layer (2) (the thickness of the recording layer at the grooves of the conventional stack in FIG. 1(*a*)) was about 80 nm. Then, a reflective layer (2) was formed by sputtering an Ag—Bi alloy (Bi: 1.0 atomic %) on this recording layer (2) so as to have a thickness of 17 nm. Furthermore, a protective coat layer with a thickness of 3 to 4 μm was formed on the reflective layer (2) by spin-coating an ultraviolet-curable resin (SD347: radical ultraviolet-curable rein manufactured by Dainippon Ink and Chemicals, Inc.). Thus, a conventional stack disk 2 was prepared.

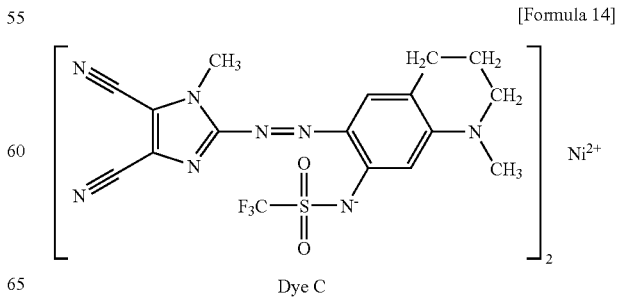

Dye C [Formula 14]

<Preparation of Dual-Layer Optical Recording Medium>

On the barrier layer of the inverted stack disk 1 prepared above, a resin A (a radical ultraviolet-curable resin manufactured by Dainippon Ink and Chemicals, Inc., elastic modulus: 4000 MPa (30° C.), glass transition temperature Tg: 174° C.) was spin-coated so as to have a thickness of 23 μm by controlling the spinning rate. Also, on the protective coat layer of the conventional stack disk 2, the resin A was spin-coated so as to have a thickness of 23 μm by controlling the spinning rate. Then, the faces coated with the resin A of the disks 1 and 2 were bonded so as to face each other and were irradiated with ultraviolet light incident on the substrate (2) of the disk 2 (conventional stack) for curing the resin A to form a transparent resin layer composed of the resin A. Thus, a dual-layer optical recording medium was prepared.

The elastic modulus and the glass transition temperature Tg of the resin A were measured with a dynamic viscoelastometer (DDV series: Rheovibron) under conditions of a frequency of 3.5 Hz and a heating rate of 3° C./min.

Conditions for High-Speed Recording of Optical Information to Disk 1 (Inverted Stack)

Conditions for recording optical information at high speed to the inverted disk 1 were as follows:
Evaluator: DDU-1000 manufactured by Pulstec Industrial Co., Ltd. (wavelength: 662 nm, objective lens numerical aperture NA: 0.65);
Recording rate: 2.4 times the speed of DVD (linear velocity: 9.2 m/s);
Recording pulse strategy: DVD+Recordable Dual Layer 8.5 G bytes Basic Format Specifications version 1.1; and
Recording power: 17 to 25 mW.

The jitter (data-to-clock jitter) was measured at 1× speed reading.

[Evaluation of MT, ST, and ΔJitter]

In general optical disk products, information is recorded so that a blank track is not generated. Therefore, MT (%) is a value reflecting the signal quality of the optical disk. MT (%) is required to be generally 13% or less, preferably 10% or less, and more preferably 9% or less. MT (%) higher than 13% tends to increase errors.

ST (%) is preferably 10% or less, more preferably 9% or less, and more preferably 8% or less. When the ST (%) is not reduced to less than 10% whatever conditions, such as the thickness of the barrier layer, or recording strategy are changed, the barrier layer is determined to be composed of an improper material.

The difference between the ST (%) and the MT (%), namely, the Δjitter, is preferably 2% or less, more preferably 1.6% or less, and further preferably 1% or less. When the difference is higher than the above range, MT (%) may exceed 13%.

Experimental Example 1

According to the above-described procedure, dual-layer optical recording medium (dual-layer DVD-R disks) each having a barrier layer with a thickness of 2 nm and composed of each material shown in Table 2 on the disks 1 were produced. Recording to the produced optical recording disk 1 at a speed 2.4 times the speed of DVD-R was conducted under the above-mentioned conditions, and ST (%), MT (%), and Δjitter were measured. Table 2 shows the obtained ST (%), MT (%), and Δjitter values. FIG. 2 is a graph plotting the thermal conductivity on the horizontal axis and the Δjitter on the vertical axis of materials having an ST of 9% or less. In the graph of FIG. 2, the marks "♦" show the values of the individual materials. The graph in FIG. 2 shows that the characteristics are sharply improved at a thermal conductivity of 70 W/m·K or more (Sn has a thermal conductivity of 67 W/m·K). Furthermore, in a thermal conductivity of 90 W/m·K or more, Δjitter is lowered to 1% or less with the exception of Si and C semiconductors. Thus, it is confirmed that significantly favorable characteristics can be obtained. Furthermore, the characteristics of Si and C will be probably improved by using them together with other metal components.

[Table 2]

TABLE 2

| Barrier layer material | Barrier layer thickness (nm) | Thermal conductivity of barrier layer material (bulk) (W/m · K) | ST (%) | MT (%) | Δjitter (%) |
|---|---|---|---|---|---|
| Cu | 2 | 401 | 7.6 | 7.9 | 0.3 |
| Al | 2 | 237 | 6.9 | 7.2 | 0.3 |
| Au | 2 | 317 | 9 | 9.5 | 0.5 |
| Co | 2 | 100 | 7.8 | 8.5 | 0.7 |
| Cr | 2 | 94 | 7.5 | 8.5 | 1 |
| Mo | 2 | 138 | 7.1 | 7.2 | 0.1 |
| Nb | 2 | 54 | 10.1 | 11 | 0.9 |
| Si | 2 | 148 | 7.6 | 9.2 | 1.6 |
| Sn | 2 | 67 | 7.7 | 10.3 | 2.6 |
| Ta | 2 | 58 | 9.8 | 10.2 | 0.4 |
| W | 2 | 174 | 7.5 | 7.8 | 0.3 |
| C | 2 | 129 | 7.2 | 8.7 | 1.5 |
| $SiO_2$ | 2 | 1.4* | 7.8 | 9.5 | 1.7 |
| SiN | 2 | 3.7** | 7.9 | 9.7 | 1.8 |
| ZnS—$SiO_2$ | 2 | 0.66*** | 7.6 | 9.7 | 2.1 |

*Quoted from Table 1 on page 277 in Kotai Butsuri (Solid Physics), Vol. 21 (1986);
**Quoted from Table I on page 415 in Japanese Journal of Applied Physics, Vol. 31 (1992), Pt. 1, No. 2B; and
***Quoted from Table III on page 425 in Japanese Journal of Applied Physics, Vol. 35 (1996), Pt. 1, No. 1B.

Figure 4:
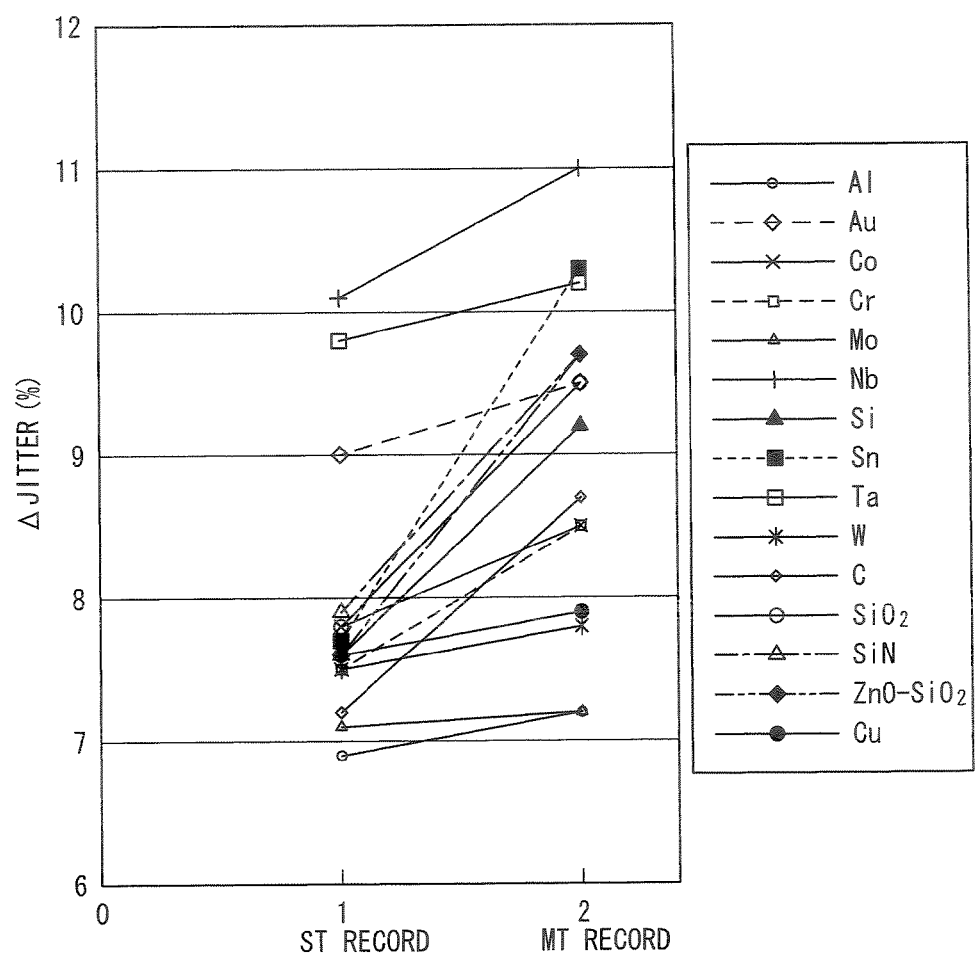
FIG. 4 is a graph showing the relationship between barrier layer materials and ST (%) and MT (%) in the inverted stack of the optical recording medium produced in Experimental Example 1.

FIG. 4 is a graph showing ST (%) and MT (%) obtained using barrier layers composed of various materials. The graph of FIG. 4 shows that the recording characteristics are significantly favorable in barrier layers made of Al (thermal conductivity: 237 W/m·K), Mo (thermal conductivity: 138 W/m·K), W (thermal conductivity: 174 W/m·K), or Cu (thermal conductivity: 401 W/m·K). In both Co and Cr, the sensibility at 4×- and 8×-speed recording is excellent, and good jitter is achieved. Ag, Al, Si, and C are likely to give favorable recording properties and weather resistance by alloying or improving photo-curable resins. Au is likely to give improved characteristics such as MT (%) and ST (%) by controlling the recording pulse strategy. However, Au has a narrow recording pulse margin and is slightly inferior to Mo, W, Cu, Co, Cr, and Al which are significantly favorable. This is probably caused by the mechanical characteristics of the barrier layer at high temperature.

In Nb and Ta, the ST (%) values exceeded 10% and Δjitter values were as low as 0.9% and 0.4%, respectively. All jitter values for the respective mark lengths were unsatisfactory, and these jitter values were not reduced even if recording strategy conditions were optimized. Therefore, Nb (thermal conductivity: 54 W/m·K) or Ta (thermal conductivity: 58 W/m·K) cannot be used as the materials for barrier layers of the present invention.

Experimental Example 2

Figure 3:
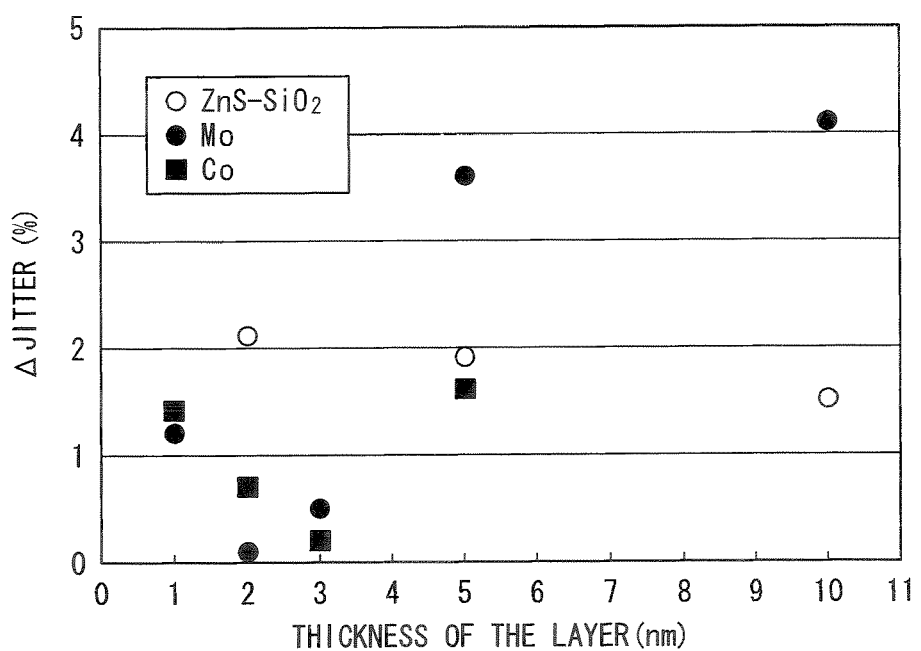
FIG. 3 is a graph showing the relationship between the barrier layer thickness and Δjitter in the inverted stack of the optical recording medium produced in Experimental Example 2.

Dual-layer optical recording medium (dual-layer DVD-R disks) having barrier layers with each thickness shown in Table 3 on the disks 1 were produced according to the above-described procedure using Mo or Co (thermal conductivity: 100 W/m·K), which had a thermal conductivity within the range of the present invention, or a dielectric material ZnS-SiO$_2$, for comparison. Recording to each of the produced optical recording disks 1 at a speed 2.4 times the speed of DVD-R was conducted under the above-mentioned conditions, and ST (%), MT (%), and Δjitter were measured. The results are shown in Table 3. FIG. 3 is a graph plotting the thickness of the barrier layer on the horizontal axis and the Δjitter on the vertical axis.

TABLE 3

| Barrier layer material | Barrier layer thickness (nm) | Thermal conductivity of barrier layer material (bulk) (W/m · K) | ST (%) | MT (%) | Δjitter (%) |
| --- | --- | --- | --- | --- | --- |
| Co | 1 | 100 | 8.6 | 10.0 | 1.4 |
| Co | 2 | 100 | 7.8 | 8.5 | 0.7 |
| Co | 3 | 100 | 9.0 | 9.2 | 0.2 |
| Co | 5 | 100 | 13.5 | 15.1 | 1.6 |
| Mo | 1 | 138 | 7.5 | 8.7 | 1.2 |
| Mo | 2 | 138 | 7.1 | 7.2 | 0.1 |
| Mo | 3 | 138 | 7.1 | 7.6 | 0.5 |
| Mo | 5 | 138 | 8.9 | 12.5 | 3.6 |
| Mo | 10 | 138 | 10.6 | 14.7 | 4.1 |
| ZnS—SiO$_2$ | 2 | 0.66**** | 7.6 | 9.7 | 2.1 |
| ZnS—SiO$_2$ | 5 | 0.66**** | 8.7 | 10.6 | 1.9 |
| ZnS—SiO$_2$ | 10 | 0.66**** | 9.3 | 10.8 | 1.5 |

****Quoted from Table III on page 425 in Japanese Journal of Applied Physics. Vol. 35 (1996), Pt. 1, No. 2B.

As obvious from the results shown in Table 3 and FIG. 3, optical recording media having barrier layers of Mo or Co, which has a thermal conductivity exceeding 70 W/m·K, have a tendency of a reduction in the Δjitter at a thickness less than 5 nm Thus, the jitter was more preferable than that of ZnS-SiO$_2$. In particular, in both Mo and Co, favorable ST (%), MT (%), and Δjitter can be stably achieved at a thickness of around 3 nm.

In ZnS-SiO$_2$, the Δjitter was about 2% regardless of thickness, and the characteristics were not favorable compared to those in the barrier layers according to the present invention. This difference is probably caused by a significantly low thermal conductivity of the dielectric material, such as less than about 1/100 of that defined in the present invention. That is, since the heat dissipation of a dielectric film is not sufficient, the groove depth is shallow and favorable crosstalk characteristics cannot be obtained in the form of an inverted stack. Furthermore, a dielectric film does not have good ductility and malleability, unlike a film of a metal, an alloy, or a semiconductor of the present invention. This probably elucidates that significantly favorable ST (%) characteristics cannot be achieved.

Experimental Example 3

Among the optical recording media produced in Experimental Example 1, recording to the optical recording media having a barrier layers composed of Mo, Cr, or Co (all layers had a thickness of 2 nm) was stacked and then the media were left in a test chamber at 80° C. and a relative humidity of 85% for 250 hours. Then, the signals on the recorded portion were read. In the every optical recording media, the PI (Parity of Inner-code) errors were substantially not changed, and favorable storage stability could be achieved.

Experimental Example 4

Preparation of Optical Recording Medium

<Preparation of Inverted Stack>

First, a substrates (1) each having a diameter of 120 mm and a thickness of 0.60 mm and each having grooves with a width of 340 nm and a depth of 28 nm arranged at a pitch of 0.74 μm were formed by injection molding of polycarbonate using an Ni stamper with a groove pattern on the surface. Then, a reflective layer (1) having a thickness of 80 nm was formed by sputtering an Ag—Bi—Nd alloy on the substrate (1). A tetrafluoropropanol solution containing an organic dye compound mixture (concentration: 2.1 wt %) of the dye A (central metal: Ni$^{2+}$) and the dye B (central metal: Zn$^{2+}$) (dye A:dye B=50 wt %:50 wt %) was prepared. This solution was dropwise applied and spin-coated on the reflective layer (1) and then dried at 70° C. for 30 min to form a recording layer (1). The OD value of the recording layer was 1.20.

The dye B in a nitrogen atmosphere has a calorific value of 40.7 Cal/g and a decomposition temperature of 278° C. and is therefore a dye having a calorific value suitable for at least heat-mode recording. The calorific value and decomposition temperature were measured by TG/DTA6200 manufactured by Seiko Instruments Inc. under conditions of a heating rate of 10° C./min and a sample weight of about 4 mg.

A dye-coating film of the dye B had absorption maximum wavelengths of 554.1 nm and 601.9 nm (strong). The absorbance of the dye B at near 660 nm, which was the recording wavelength, was 15.5% of the maximum absorption. Thus, the dye B absorbs light with a suitable intensity for recording on the second-layer recording layer of a dual-layer optical recording medium.

Then, immediately after the formation of the recording layer (1), a film was formed on this recording layer (1) by sputtering ZnS-SiO$_2$ so as to have a thickness of 130 nm. Thus, an inverted stack disk 1 was prepared.

<Preparation of Conventional Stack>

Polycarbonate substrates (2) each having guide grooves with a depth of 160 nm and a width of 360 nm arranged at a track pitch of 740 nm was formed. Then, a tetrafluoropropanol solution containing a mixture (concentration: 2 wt %) of the dye A and the dye C (dye A:dye C=10 wt %:90 wt %) was dropwise applied and spin-coated on the face with the guide grooves of this substrate (2) and then dried at 70° C. for 30 min to form a recording layer (2). The thickness of this recording layer (2) (the thickness of the recording layer at the grooves of the conventional stack in FIG. 1(*a*)) was about 80 nm. Then, a reflective layer (2) was formed by sputtering an Ag—Bi alloy (Bi: 1.0 atomic %) on this recording layer (2) so as to have a thickness of 17 nm. Furthermore, a protective coat layer with a thickness of 3 to 4 μm was formed on the reflective layer (2) by spin-coating an ultraviolet-curable resin (SD347: radical ultraviolet-curable rein manufactured by Dainippon Ink and Chemicals, Inc.). Thus, a conventional stack disk 2 was prepared.

<Preparation of Dual-Layer Optical Recording Medium>

On the barrier layer of the reversely laminated disk 1 prepared above, a resin A (a radical ultraviolet-curable resin manufactured by Dainippon Ink and Chemicals, Inc., elastic modulus: 4000 MPa (30° C.), glass transition temperature Tg: 174° C.) was spin-coated so as to have a thickness of 23 μm by controlling the spinning rate. At the same time, on the protective coat layer of the conventional stack disk 2, the resin A was spin-coated so as to have a thickness of 23 μm by controlling the spinning rate. Then, the faces coated with the resin A of the disks 1 and 2 were bonded so as to face each other and were irradiated with ultraviolet light incident on the substrate (2) of the disk 2 (forward laminate) for curing the resin A to form a transparent resin layer composed of the resin A. Thus, a dual-layer optical recording medium was prepared.

The elastic modulus and the glass transition temperature Tg of the resin A were measured with a dynamic viscoelastometer (DDV series: Rheovibron) under conditions of a frequency of 3.5 Hz and a heating rate of 3° C./min.

Condition for High-Speed Recording to Disk 1
(Reverse Laminate)

Conditions for recording optical information at high speed to the disk 1 (reverse laminate) were as follows:

Evaluator: DDU-1000 manufactured by Pulstec Industrial Co., Ltd. (wavelength: 662 nm, objective lens numerical aperture NA: 0.65);

Recording rate: four times the speed of DVD (4× recording) (linear velocity: 15.3 m/s);

Recording pulse strategy; DVD+Recordable Dual Layer 8.5 G bytes Basic Format Specifications version 1.1;

Pulse power ratio: $P_0/P_m$=1.7; and

Recording power: 20 to 40 mW.

The jitter (data-to-clock jitter) was measured at 1× speed reading.

Figure 6A:
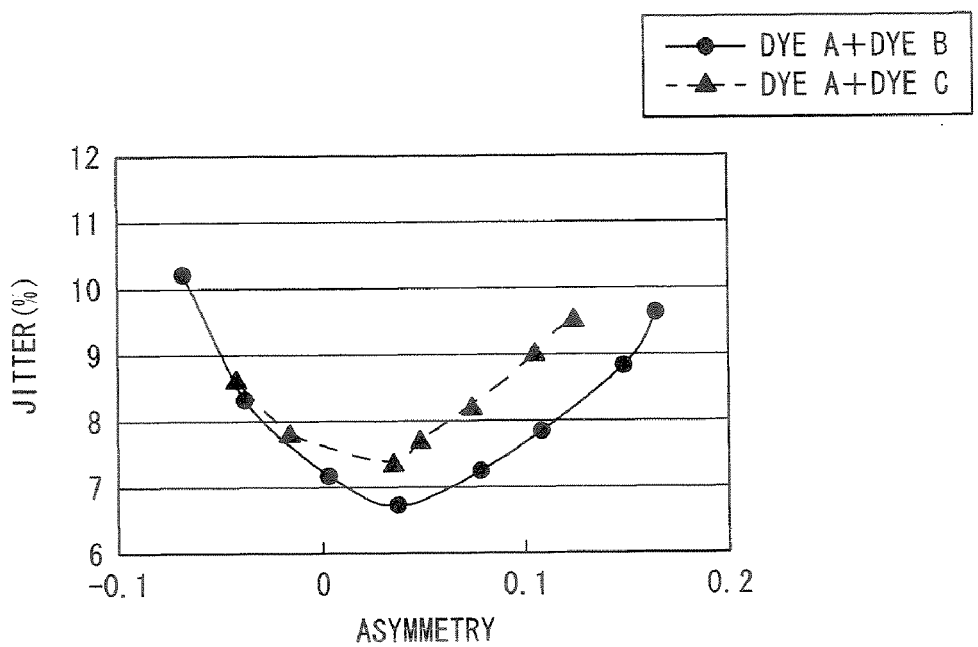
FIG. 6(a) is a graph showing the relationship between jitter and asymmetry in the reverse laminate of the optical recording medium produced in Experimental Example 4.
Figure 6B:
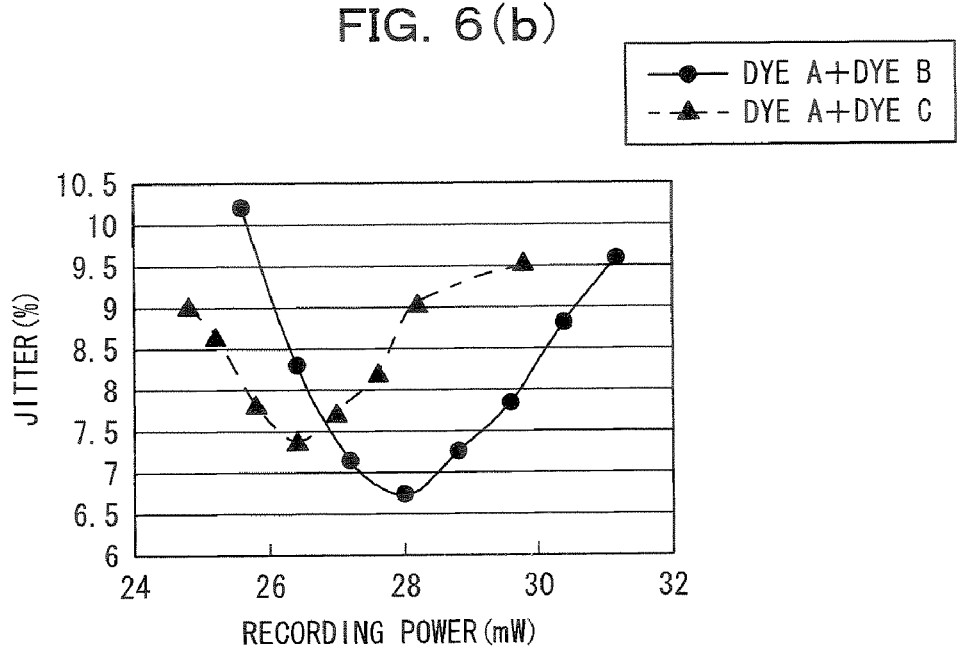
FIG. 6(b) is a graph showing the relationship between jitter and recording power in the inverted stack of the optical recording medium produced in Experimental Example 4.

FIG. 6(a) is a graph showing the relationship between jitter and asymmetry in the inverted stack of the optical recording medium produced in Experimental Example 4, and FIG. 6(b) is a graph showing the relationship between jitter and recording power in the inverted stack of the optical recording medium produced in Experimental Example 4. The term "asymmetry" means the value prescribed as "asymmetry" in DVD-R or DVD+R standards. A plus asymmetry value means the recording power is sufficiently high for writing, and a minus asymmetry value means the recording power is insufficient.

In FIG. 6(a), the curve denoted by "dye A+dye B" shows the asymmetry margin of jitter of an inverted stack having a recording layer (1) containing Zn as the central metal ion. The jitter of the dual-layer optical recording medium was as satisfactory low as 9% even if asymmetry was changed in the very wide range from −5% ("−0.05" in FIG. 6(a)) to a value slightly larger than +15% ("0.15" in FIG. 6(a)) and also at a very high-speed recording of 4 times.

In FIG. 6(a), the curve denoted by "dye A+dye C" shows the asymmetry margins of jitter of an inverted stack at 4× recording under the same conditions as above. The inverted stack was prepared as in Experimental Example 4, except that dye C of which central metal was not Zn ions was used instead of the dye B of which central metal was Zn ions and that the ratio of the dyes was dye A:dye C=40 wt %:60 wt %. The asymmetry margin and the bottom jitter of "dye A+dye C" were unfavorable compared to those of the combination of "dye A+dye B". The dye C in a nitrogen atmosphere had a calorific value of 27.6 Cal/g and a decomposition temperature of 348° C. A dye-coating film of the dye C had absorption maximum wavelengths of 547.11 nm and 597.05 nm. The absorbance of the dye C at near 660 nm, which was the recording wavelength, was 14.4% of the maximum absorption. Thus, the absorption spectrum shape of a film of the dye C was broad compared to that of a film of the dye B.

FIG. 6(b) shows MT % values of the above-described inverted stack containing "dye A+dye B" or "dye A+dye C" measured at 4× recording while the recording laser power was changed. In the values of MT %, a combination of "dye A+dye B" was superior to a combination of "dye A+dye C".

It is obvious by the results above that inverted stack containing a dye having $Zn^{2+}$ as the central metal according to the present invention have a wide asymmetry margin of jitter and a good jitter value and that the crosstalk is low.

Experimental Example 5

In Experimental Example 5, dual-layer optical recording media having a structure shown in FIG. 5 were prepared according to the following procedure, and the MT (%) and ST (%) values of optical information recorded on the recording layers (1) (second-layer recording layer) were measured.

First, a substrates (2) each having a diameter of 120 mm and a thickness of 0.57 mm and each having grooves with a width of 0.33 μm and a depth of 160 nm arranged at a pitch of 0.74 μm were formed by injection molding of polycarbonate using a Ni stamper with a groove pattern on the surface.

Then, a tetrafluoropropanol solution containing a mixture (concentration: 2 wt %) of the dye A and the dye C (dye A:dye C=10 wt %:90 wt %) was dropwise applied and spin-coated on the substrate (2) and then dried at 70° C. for 30 min to form a recording layer (2). Then, a semi-transparent reflective layer (2) having a thickness of 17 nm was formed by sputtering an Ag alloy composed of Ag—Bi (Bi: 1.0 atomic %) on the recording layer (2).

Then, a film having a thickness of about 25 μm was formed on the reflective layer (2) by dropwise applying a predetermined ultraviolet-curable resin [1] in a circle by spinner-coating. At the same time, a film having a thickness of about 25 μm was formed on the face having guide grooves of a resin stamper by dropwise applying a predetermined ultraviolet-curable resin [2] in a circle by spinner-coating.

Then, the resin stamper was attached to the reflective layer (2) so that the resin layer composed of the ultraviolet-curable resin [1] faces the resin layer composed of the ultraviolet-curable resin [2]. Then, these resin layers were adherent to each other to form an adhering structure including a transparent resin layer (2P layer) having guide grooves by curing these resin layers by ultraviolet light incident on the resin stamper. The guide grooves formed on the transparent resin were arranged at a track pitch of 0.74 μm and had a width of 290 nm and a depth of 190 nm.

The ultraviolet-curable resins [1] and [2] were the following radical ultraviolet-curable resins. The glass transition temperatures of the ultraviolet-curable resins [1] and [2] are shown in parentheses.

Ultraviolet-curable resin [1]: SD6036 (Tg=60° C.) manufactured by Dainippon Ink and Chemicals, Inc.

Ultraviolet-curable resin [2]: MPZ388 (Tg=161° C.) manufactured by Nippon Kayaku Co., Ltd.

On the transparent resin layer (2P layer), a tetrafluoropropanol solution containing an organic dye compound mixture (concentration: 2.1 wt %) of the dye A (central metal: $Ni^{2+}$), the dye B (central metal: $Zn^{2+}$), and dye D (central metal: $Zn^{2+}$) represented by the following formula (dye A: (dye B and dye D)=50 wt %:(15 wt %+35 wt %)=50 wt %:50 wt %) was dropwise applied and spin-coated and then dried at 70° C. for 30 min to form a recording layer (1).

[Formula 15]

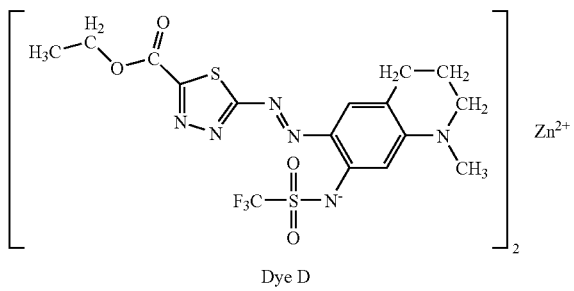

Dye D

The dye B in a nitrogen atmosphere had a calorific value of 40.7 Cal/g and a decomposition temperature of 278° C. The dye D in a nitrogen atmosphere had a calorific value of 34.1 Cal/g and a decomposition temperature of 251° C. Therefore, these dyes containing $Zn^{2+}$ as the central metal ion had a calorific value suitable for at least heat-mode recording. The calorific values and decomposition temperatures were measured by TG/DTA6200 manufactured by Seiko Instruments Inc. under conditions of a heating rate of 10° C./min and a sample weight of about 4 mg.

A dye-coating film of the dye B had absorption maximum wavelengths of 554.1 nm and 601.9 nm (strong). The absorbance of the dye B at near 660 nm, which was the recording wavelength, was 15.5% of the maximum absorption. Thus, the dye B absorbs light with a suitable intensity for recording on the second-layer recording layer of a dual-layer optical recording medium.

A dye-coating film of the dye D had absorption maximum wavelengths of 561.6 nm and 608.3 nm (strong). The absorbance of the dye D at near 660 nm, which was the recording wavelength, was 20.1% of the maximum absorption. Thus, the dye D absorbs light with a suitable intensity for recording to the second-layer recording layer of a dual-layer optical recording medium.

Then, a reflective layer (1) having a thickness of 120 nm was formed by sputtering an Ag alloy composed of Ag—Bi (Bi: 1.0 atomic %).

Then, an adhesion layer was formed on the reflective layer (1) by spin-coating an ultraviolet-curable resin. Then, a polycarbonate substrate with a diameter of 120 mm and a thickness of 0.6 mm as the substrate (2) was placed on this adhesion layer and adherent by curing the resin by ultraviolet light irradiation. Thus, a dual-layer optical recording medium was produced by the 2P process.

Condition for High-Speed Recording on Recording Layer (1) of Dual-Layer Optical Recording Medium Conditions for recording optical information at high speed on the recording layer of a dual-layer optical recording medium were as follows:

Evaluator: ODU-1000 manufactured by Pulstec Industrial Co., Ltd. (wavelength: 660 nm, objective lens numerical aperture NA: 0.65);

Recording rate: eight times the speed of DVD (8× recording) (linear velocity: 30.67 m/s);

Recording pulse strategy; DVD+Recordable Dual Layer 8.5 G bytes Basic Format Specifications version 1.1;

Pulse power ratio: $P_O/P_m = 1.3$; and

Recording power: 40 to 52 mW.

The jitter (data-to-clock jitter) was measured at 1× speed reading.

Figure 7:
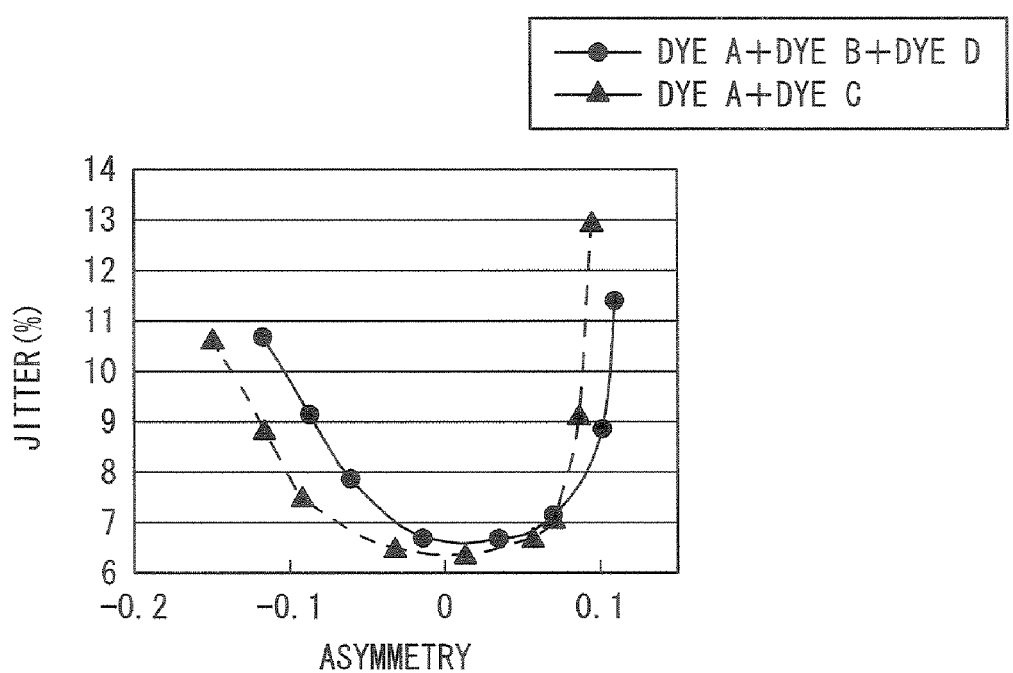
FIG. 7 is a graph showing the relationship between jitter and asymmetry in the recording layer (1) of the optical recording medium produced in Experimental Example 5.

FIG. 7 is a graph showing the relationship between jitter and asymmetry in the recording layer (1) of the optical recording medium produced in experimental examination 5.

In FIG. 7, the curve denoted by "dye A+dye B+dye D" shows the asymmetry margins of jitter for recording on the recording layer (1) at eight times speed. The jitter was 9% or less under conditions that the asymmetry of the recording layer (1) of the "dye A+dye B+dye D" was significantly large, i.e., about +10% ("0.1" in FIG. 7). Thus, the dual-layer optical recording medium had significantly favorable high-speed recording characteristics.

A dual-layer optical recording medium was prepared in the same manner as above except that dye C containing $Ni^{2+}$ as the central metal ion was used instead of the dye B and the dye D and the ratio of dyes was dye A:dye C=50 wt %:50 wt %. Recording on the recording layer (1) of the dual-layer optical recording medium was conducted at eight times speed as in above. The results are shown in FIG. 7 as the curve denoted by "dye A+dye C". The dye C in a nitrogen atmosphere had a calorific value of 27.6 Cal/g and a decomposition temperature of 348° C. A dye-coating film of the dye C had absorption maximum wavelengths of 547.11 nm and 597.05 nm. The absorbance of the dye C at near 660 nm, which was the recording wavelength, was 14.4% of the maximum absorption. Thus, the absorption spectrum shape of a film of the dye C was broad compared to that of a film of the dye B and dye D.

The results shown in FIG. 7 show that the jitter sharply increases and gets worse with an increase in the asymmetry exceeding +6% in the recording layer (1) containing dye A and dye C. However, the combination of dye B and dye D, which have $Zn^{2+}$ as the central metals, according to the present inventions allows significantly favorable recording on the second-layer recording layer (recording layer (1)) of a dual-layer optical recording medium at extremely high-speed such as 8 times speed.

INDUSTRIAL APPLICABILITY

The present invention can be suitably applied to optical recording media for red-semiconductor laser or for blue semiconductor laser, such as DVD±R.

This application is based on Japanese Patent Application (Patent Application No. 2005-111244) filed on Apr. 7, 2005 and Japanese Patent Application (Patent Application No. 2006-104917) filed on Apr. 6, 2006, the entire contents of which are incorporated herein by reference.

The invention claimed is:

1. An optical recording medium comprising:
   a reflective layer, a dye-containing recording layer, and a transparent resin layer on a substrate in this order; and
   a barrier layer between the recording layer and the resin layer, wherein
   the barrier layer comprises a material having a thermal conductivity M of a bulk state of 70 W/m·K or more at 300 K; and
   a thickness t of the barrier layer is 1 nm or more and less than 5 nm.

2. The optical recording medium according to claim 1, wherein the thermal conductivity M is 90 W/m·K or more.

3. The optical recording medium according to claim 1 or 2, wherein the thickness t is 1 nm or more and 4 nm or less.

4. The optical recording medium according to claim 1, wherein
   the barrier layer comprises a metal element or an alloy containing the metal element as a main component, wherein the metal element is selected from the group consisting of Mg, Cr, Mn, Fe, Ni, Zn, Ru, Rh, Pd, In, Os, Ir, Pt, Mo, Al, W, Co, Cr, Cu, Ag, and Au.

5. The optical recording medium according to claim 4, wherein
the barrier layer comprises a metal element or an alloy containing the metal element as a main component, wherein the metal element is selected from the group consisting of Mo, W, Cu, Co, Cr, and Al.

6. The optical recording medium according to claim 1, further comprising:
a second reflective layer, a second recording layer, and a transparent substrate in the listed order on the transparent resin layer.

7. The optical recording medium according to claim 6, wherein
the recording layer comprises at least a metal-complex azo dye comprising an azo compound of formula (1) and Zn ions:

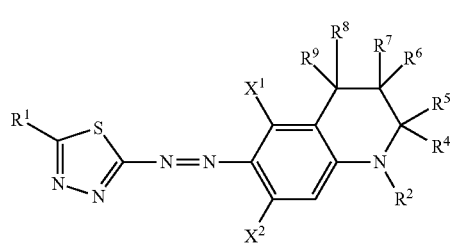

(1)

wherein
R$^1$ is a hydrogen atom or an ester group represented by CO$_2$R$^3$ wherein R$^3$ is a linear or branched alkyl group or a cycloalkyl group;
R$^2$ is a linear or branched alkyl group;
at least one of X$^1$ and X$^2$ is an NHSO$_2$Y group wherein Y is a linear or branched alkyl group containing at least two substituted fluorine atoms and the X$^1$ or X$^2$ not being the NHSO$_2$Y group is a hydrogen atom;
R$^4$ and R$^5$ are each independently a hydrogen atom, a linear or branched alkyl group, or a linear or branched alkoxy group; and
R$^6$, R$^7$, R$^8$, and R$^9$ are each independently a hydrogen atom or an alkyl group having one or two carbon atoms;
with the proviso that the NHSO$_2$Y group is modified to an NSO$_2$Y$^-$ (anionic) group by H$^+$ dissociation and that the azo compound of formula (1) forms a coordinate bond with the metal ion.

8. The optical recording medium according to claim 2, wherein
the barrier layer comprises a metal element or an alloy containing the metal element as a main component, wherein the metal element is selected from the group consisting of Mg, Cr, Mn, Fe, Ni, Zn, Ru, Rh, Pd, In, Os, Ir, Pt, Mo, Al, W, Co, Cr, Cu, Ag, and Au.

9. The optical recording medium according to claim 2, further comprising:
a second reflective layer, a second recording layer, and a transparent substrate in the listed order on the transparent resin layer.

10. The optical recording medium according to claim 9, wherein
the recording layer comprises at least a metal-complex azo dye comprising an azo compound of formula (1) and Zn ions:

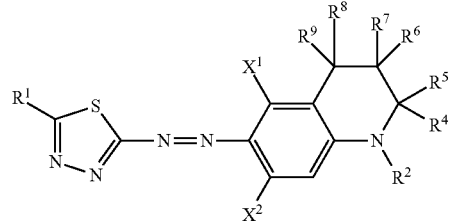

(1)

wherein
R$^1$ is a hydrogen atom or an ester group represented by CO$_2$R$^3$ wherein R$^3$ is a linear or branched alkyl group or a cycloalkyl group;
R$^2$ is a linear or branched alkyl group;
at least one of X$^1$ and X$^2$ is an NHSO$_2$Y group wherein Y is a linear or branched alkyl group containing at least two substituted fluorine atoms and the X$^1$ or X$^2$ not being the NHSO$_2$Y group is a hydrogen atom;
R$^4$ and R$^5$ are each independently a hydrogen atom, a linear or branched alkyl group, or a linear or branched alkoxy group; and
R$^6$, R$^7$, R$^8$, and R$^9$ are each independently a hydrogen atom or an alkyl group having one or two carbon atoms;
with the proviso that the NHSO$_2$Y group is modified to an NSO$_2$Y$^-$ (anionic) group by H$^+$ dissociation and that the azo compound of formula (1) forms a coordinate bond with the metal ion.

* * * * *